US011934024B2

(12) United States Patent
Solheid et al.

(10) Patent No.: US 11,934,024 B2
(45) Date of Patent: *Mar. 19, 2024

(54) TELECOMMUNICATIONS MODULE AND FRAME

(71) Applicant: CommScope Technologies LLC, Hickory, NC (US)

(72) Inventors: James J. Solheid, Minneapolis, MN (US); Kristofer Bolster, Jordan, MN (US); Soutsada Vongseng, Chanhassen, MN (US); Thomas G. LeBlanc, Westminster, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,185

(22) Filed: Sep. 28, 2022

(65) Prior Publication Data

US 2023/0161129 A1 May 25, 2023

Related U.S. Application Data

(63) Continuation of application No. 17/065,726, filed on Oct. 8, 2020, now Pat. No. 11,467,362, which is a
(Continued)

(51) Int. Cl.
*G02B 6/44* (2006.01)
*G02B 6/38* (2006.01)

(52) U.S. Cl.
CPC ......... *G02B 6/4457* (2013.01); *G02B 6/3897* (2013.01); *G02B 6/443* (2013.01); *G02B 6/445* (2013.01)

(58) Field of Classification Search
CPC .... G02B 6/4457; G02B 6/3897; G02B 6/443; G02B 6/445
See application file for complete search history.

(56) References Cited

U.S. PATENT DOCUMENTS 4,650,933 A 3/1987 Benda et al.
4,768,961 A 9/1988 Lau
(Continued)

FOREIGN PATENT DOCUMENTS

DE 41 30 706 A1 3/1993
DE 202 01 170 U1 5/2002
(Continued)

OTHER PUBLICATIONS

ADC Telecommunications, Inc., "DS3 Digital Signal Cross-Connect (DSX3) System Application Guide," Document No. ADCP-80-323, 1st Edition, Issue 2, Dec. 1996, p. 1-10; p. 1-11.
(Continued)

*Primary Examiner* — Sung H Pak
*Assistant Examiner* — Hoang Q Tran
(74) *Attorney, Agent, or Firm* — Merchant & Gould P.C.

(57) ABSTRACT

A telecommunications chassis comprises a cable sealing portion defining at least one cable opening configured to sealably receive a cable and a module mounting portion extending from the cable sealing portion, which further comprises a housing defining an open front closable by a door to define an interior, a rear wall, a right wall, and a left wall. A plurality of module mounting locations is provided in a vertically stacked arrangement, each configured to receive a telecommunications module through the open front. An exterior of the housing includes a first column of radius limiters defining curved profiles for guiding cables from the front toward the rear with bend control. A second column of radius limiters in the form of spools is spaced apart and generally parallel to the first column of radius limiters and a third column of radius limiters, at least some of which are in the form of spools, is also spaced apart and generally parallel to the first and second columns of radius limiters. The rear wall defines an opening for accessing from
(Continued)

the exterior of the housing rear ends of modules to be mounted in the housing for signal input, wherein the exterior also includes a plate at least partially overlapping the opening for protection of cables entering the opening.

14 Claims, 37 Drawing Sheets

Related U.S. Application Data continuation of application No. 16/290,512, filed on Mar. 1, 2019, now Pat. No. 10,802,238, which is a continuation of application No. 15/479,463, filed on Apr. 5, 2017, now Pat. No. 10,222,571.

(60) Provisional application No. 62/319,535, filed on Apr. 7, 2016.

(56) References Cited

U.S. PATENT DOCUMENTS

| | | |
|---|---|---|
| 4,770,639 A | 9/1988 | Lau |
| 4,797,114 A | 1/1989 | Lau |
| 4,820,200 A | 4/1989 | Lau |
| 4,840,568 A | 6/1989 | Burroughs et al. |
| 5,189,410 A | 2/1993 | Kosugi et al. |
| 5,199,878 A | 4/1993 | Dewey et al. |
| 5,214,673 A | 5/1993 | Morgenstern et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 6,116,961 A | 9/2000 | Henneberger et al. |
| 6,208,796 B1 | 3/2001 | Vigliaturo |
| 6,226,111 B1 | 5/2001 | Chang et al. |
| 6,263,136 B1 | 7/2001 | Jennings et al. |
| 6,307,998 B2 | 10/2001 | Vigliaturo |
| 6,328,608 B1 | 12/2001 | Olson et al. |
| 6,363,183 B1 | 3/2002 | Koh |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,719,382 B2 | 4/2004 | Sucharczuk et al. |
| 6,760,531 B1 | 7/2004 | Solheid et al. |
| 6,761,594 B2 | 7/2004 | Johnsen et al. |
| 6,810,193 B1 | 10/2004 | Müller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,885,798 B2 | 4/2005 | Zimmel |
| 6,890,187 B2 | 5/2005 | Norris |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,118,284 B2 | 10/2006 | Nakajima et al. |
| 7,142,764 B2 | 11/2006 | Allen et al. |
| 7,190,874 B1 * | 3/2007 | Barth .............. G02B 6/4442 385/134 |
| 7,194,181 B2 | 3/2007 | Holmberg et al. |
| 7,218,827 B2 | 5/2007 | Vongseng et al. |
| 7,233,731 B2 | 6/2007 | Solheid et al. |
| 7,303,220 B2 | 12/2007 | Zellak |
| 7,310,474 B2 | 12/2007 | Kanasaki et al. |
| 7,333,606 B1 | 2/2008 | Swam et al. |
| 7,346,254 B2 | 3/2008 | Kramer et al. |
| 7,359,611 B1 | 4/2008 | Kaplan |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,606,459 B2 | 10/2009 | Zimmel et al. |
| 7,636,507 B2 | 12/2009 | Lu et al. |
| 7,853,112 B2 | 12/2010 | Zimmel et al. |
| 7,912,336 B2 | 3/2011 | Zimmel |
| 8,346,045 B2 | 1/2013 | Zimmel et al. |
| 10,222,571 B2 | 3/2019 | Solheid et al. |
| 10,802,238 B2 | 10/2020 | Solheid et al. |
| 2005/0232551 A1 | 10/2005 | Chang et al. |
| 2005/0232565 A1 | 10/2005 | Heggestad et al. |
| 2006/0029353 A1 | 2/2006 | Bolster et al. |
| 2006/0093303 A1 * | 5/2006 | Reagan .............. G02B 6/4442 385/76 |
| 2007/0036503 A1 | 2/2007 | Solheid et al. |
| 2007/0147765 A1 | 6/2007 | Gniadek et al. |
| 2009/0022468 A1 | 1/2009 | Zimmel |
| 2013/0114937 A1 | 5/2013 | Zimmel et al. |
| 2013/0230291 A1 | 9/2013 | Lichoulas et al. |
| 2014/0086545 A1 | 3/2014 | Solheid et al. |
| 2015/0234141 A1 | 8/2015 | Bolster et al. |

FOREIGN PATENT DOCUMENTS

| | | |
|---|---|---|
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| GB | 2 300 978 A | 11/1996 |
| JP | 2012-527653 A | 11/2012 |
| WO | 00/75706 A2 | 12/2000 |
| WO | 96/75706 A2 | 12/2000 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |

OTHER PUBLICATIONS

ADC Telecommunications, Inc., "DSX-1 Digital Signal Cross Connect PIX-DSX-1—Fifth Edition," Oct. 1994, 36 pages.

ADC Telecommunications, Inc., "DSX-3 Digital Signal Cross-Connect, Front and Rear Cross-Connect Products, Second Edition," Doc. No. 274, Oct. 2004, 66 pages.

ADC Telecommunications, Inc., "OmniReach FTTP Solutions, Fiber Distribution Terminals," Doc. No. 1276550, May 2004, 13 pages.

(56) References Cited

OTHER PUBLICATIONS

ADC Telecommunications, Inc., "PxPlus™ DS1 Digital Signal Cross-Connect," Jan. 1997, 12 pages.

\* cited by examiner

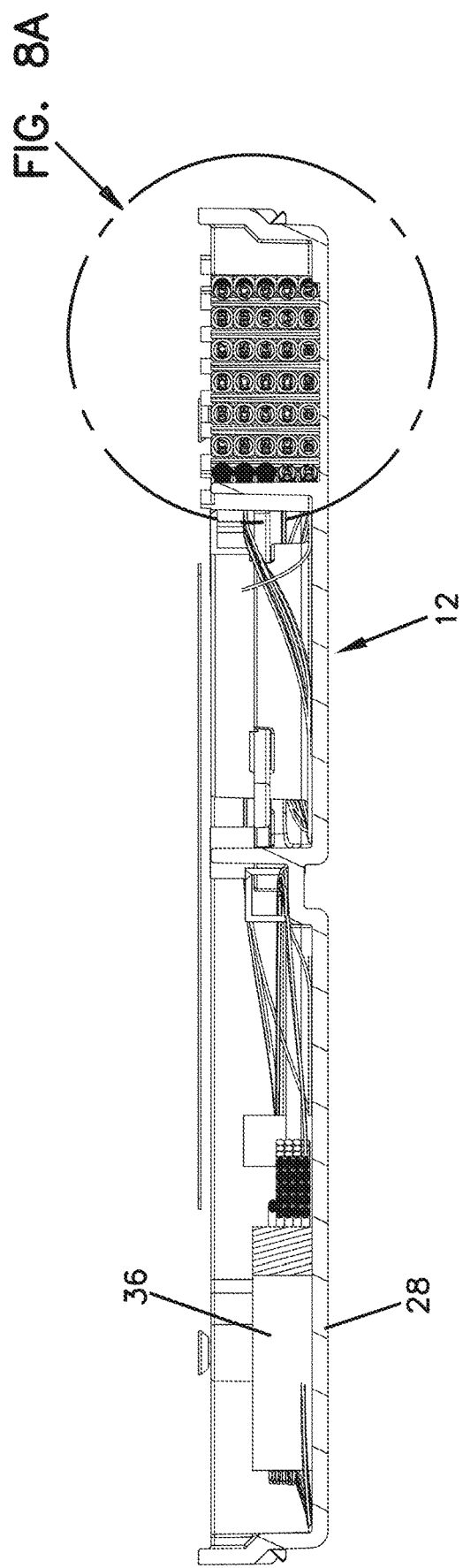

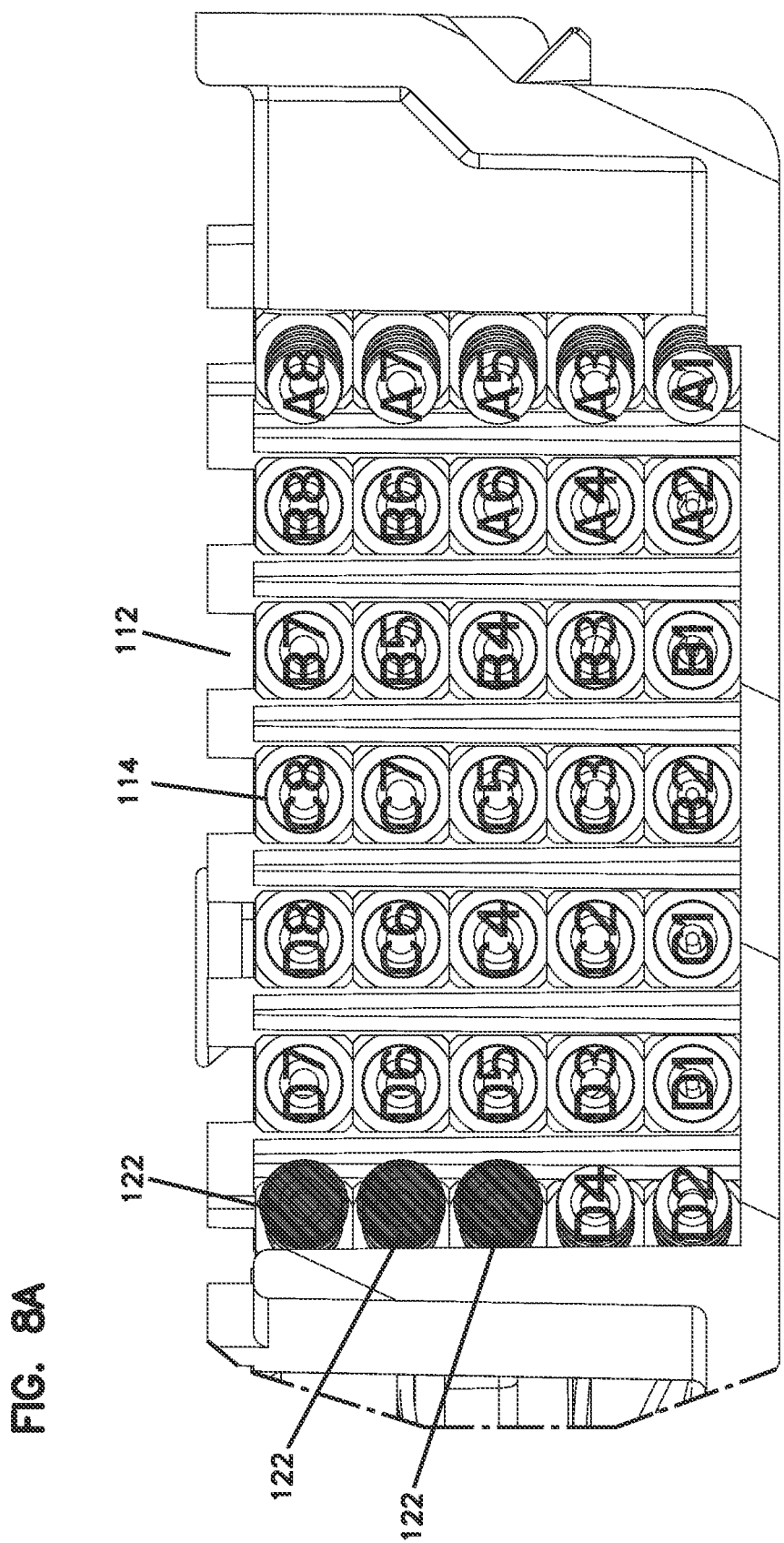

TELECOMMUNICATIONS MODULE AND FRAME

CROSS REFERENCE TO RELATED APPLICATIONS

This application is a continuation of U.S. application Ser. No. 17/065,726, filed Oct. 8, 2020; now U.S. Pat. No. 11,467,362; which is a continuation of U.S. application Ser. No. 16/290,512, filed Mar. 1, 2019, now U.S. Pat. No. 10,802,238; which is a continuation of U.S. application Ser. No. 15/479,463, filed Apr. 5, 2017, now U.S. Pat. No. 10,222,571; which claims the benefit of U.S. Provisional Application No. 62/319,535, filed Apr. 7, 2016, the disclosures of which is hereby incorporated herein by reference.

FIELD

The present disclosure generally relates to fiber optic telecommunications equipment. More specifically, the present disclosure relates to modular elements housing fiber optic telecommunications equipment that are mounted to telecommunications frames.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting fixture such as a chassis or a tray capable of mounting multiple modules may be used in such an installation.

While the fixture may accept several modules, the initial installation may only include fewer modules mounted in the fixture, or enough to serve current needs. These fixtures may be configured with limited access to one or more sides, or may be mounted in cramped locations. In addition, some of these fixtures may be pre-configured with the maximum capacity of transmission cables to accommodate and link to modules which may be installed in the future. Since it is desirable to have access to components within the fixture for cleaning during the installation of a new module, some provision or feature of the fixture will desirably permit a user to access and clean the connectors of these pre-connectorized and pre-installed transmission cables.

In fiber-optic telecommunications, it is also common for optical signals of transmission cables to be multiplexed. Wavelength division multiplexing (WDM) is a technology which multiplexes multiple optical carrier signals on a single optical fiber by using different wavelengths of laser light to carry different signals. This allows for a multiplication in capacity, in addition to making it possible to perform bidirectional communications over one strand of fiber.

Improvements in the design of such telecommunications modules and the telecommunications frames for mounting them are desired.

SUMMARY

The present disclosure relates to a telecommunications assembly including a telecommunications fixture such as a tray and at least one telecommunications module mounted within the tray. Within an interior of each of the modules is located a fiber optic component. In one embodiment, the fiber optic component may be a fiber optic splitter. In another embodiment, the fiber optic component may be a fiber optic division multiplexer/demultiplexer. The module may include one or more signal input locations and one or more signal output locations. In certain embodiments, the signal input locations may be adjacent the signal output locations, and the cabling extending from the signal input locations to the fiber optic component and then to the signal output locations from the fiber optic component may utilize the same cable management features within the module housing. When the module is used as a fiber optic division multiplexer/demultiplexer module, the multiplexer/demultiplexer, as a receiver, is configured to demultiplex multiple optical carrier signals carried by the single input optical fiber into different wavelengths of laserlight as customer output signals. As a transmitter, the multiplexer/demultiplexer is configured to multiplex the customer signals, which are different wavelengths of laserlight, and combine them into a single optical fiber to be outputted from the module.

According to another aspect of the present disclosure, the module comprises a housing including a main housing portion defining an interior formed by a first sidewall, a second sidewall, a bottom wall, a front wall, and a rear wall, the housing further including a removable cover mounted to the main housing portion to define a top wall. The interior defines a right chamber separated from a left chamber. A fiber optic component is housed within the left chamber. A signal input location for receiving an input signal to be processed by the fiber optic component and a signal output location for exiting an output signal processed by the fiber optic component are both exposed to the right chamber, wherein both the signal input location and the signal output location are defined by the front wall, wherein a cable carrying the input signal is fixed adjacent the signal input location via a crimp assembly, and a cable carrying the output signal is fixed adjacent the signal output location via a crimp assembly, wherein an excess fiber length formed when an outer jacket of the cables contracts more than the fiber therewithin due to temperature variations is accommodated by the right chamber to allow the excess fiber length to accumulate without bending in a radius smaller than a minimum bend radius. A cable management structure is positioned within the right chamber, the cable management structure being a dual-layered cable management structure defining a lower cable-wrapping level and a separate upper cable-wrapping level, wherein the upper cable-wrapping level is defined by a removable cable retainer that is mounted on a spool defining the lower-cable wrapping level, the dual layered cable management structure including both the cable carrying the input signal and the cable carrying the output signal wrapped therearound for cable management. The cable carrying the input signal and the cable carrying the output signal are passed between the right chamber and the left chamber before and after being processed by the fiber optic component, respectively, wherein at least one of the rear wall, the first sidewall, and the second sidewall defines a curved portion for providing bend radius protection to the cables carrying the input and output signals within the module.

According to another aspect, the disclosure is directed to a telecommunications chassis/frame for receiving a plurality of the above-discussed modules.

According to one inventive aspect, such a chassis includes a cable sealing portion defining at least one cable opening configured to sealably receive a cable and a module mounting portion extending from the cable sealing portion. The module mounting portion further comprises a housing defining an open front closable by a door to define an interior, a rear wall, a right wall, and a left wall, the housing further defining a plurality of module mounting locations provided in a vertically stacked arrangement within the interior, each configured to receive a telecommunications module through the open front, an exterior of the housing including a first column of radius limiters each defining a curved profile for guiding cables from the front of the housing toward the rear with bend control, the exterior of the housing including a second column of radius limiters in the form of spools that are spaced apart and generally parallel to the first column of radius limiters, the exterior of the housing further including a third column of radius limiters, at least some of which are in the form of spools that are spaced apart and generally parallel to the first and second columns of radius limiters, the rear wall defining an opening for accessing from the exterior of the housing rear ends of modules to be mounted in the housing for signal input, wherein the exterior of the housing includes a plate at least partially overlapping the opening for protection of cables entering the opening.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows:

FIG. 8 is cross-sectional view taken along line 8-8 of FIG. 7;

FIG. 8A is a close-up view of the output cable crimp holding portion of the module of FIG. 8;

DETAILED DESCRIPTION

Figure 1:
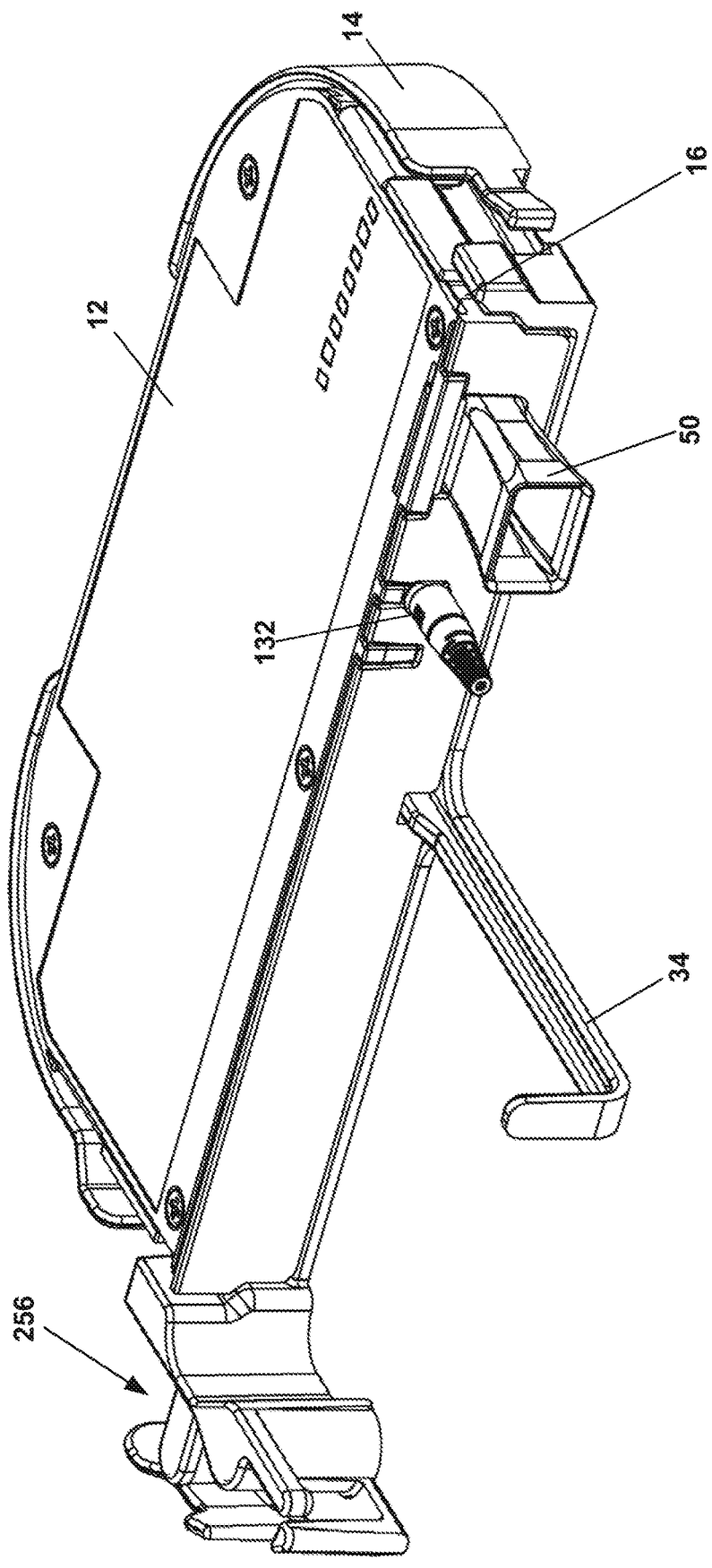
FIG. 1 is a front perspective view of a telecommunications assembly including a telecommunications module having features that are examples of inventive aspects in accordance with the present disclosure mounted within a telecommunications fixture in the form of a tray.

Reference will now be made in detail to exemplary aspects of the present disclosure which are illustrated in the accompanying drawings. Wherever possible, the same reference numbers will be used throughout the drawings to refer to the same or similar parts.

FIGS. 1-4 illustrate a telecommunications assembly 10 including a telecommunications module 12 having features that are examples of inventive aspects in accordance with the present disclosure mounted within a telecommunications fixture in the form of a tray 14. The depicted fixture in the form of a tray 14 may be mounted to other telecommunications fixtures such as chassis/frame, etc.

In the given embodiment, the telecommunications module 12 defines notches 16 on a right sidewall 18 and a left sidewall 20 of a main housing portion 22 of the module housing 24 for receiving elastic ramped tabs 26 provided on the tray 14 for mounting the module 12 to the tray 14 with a snap-fit interlock.

A bottom wall 28 defined by the module main housing portion 22 also includes a cutout 30 extending in a front-to-back direction for accommodating a center divider 32 of the tray 14. The center divider 32 of the tray 14 extends all the way across the tray 14 and transitions into a cable management finger 34 that protrudes outwardly from the front of the tray 14.

It should be noted that although the module 12 of the present disclosure is depicted as being mounted on a telecommunications tray 14, the module 12 may be utilized in other types of fixtures, and the depicted tray 14 is only one example of such a fixture.

FIGS. 5-13 illustrate the telecommunications module 12 having features that are examples of inventive aspects in accordance with the present disclosure. Since one of the telecommunications equipment housed by the module is a fiber optic splitter 36, the telecommunications module 12 may also be referred to herein as a fiber optic splitter module 12. It should be noted that an optical splitter 36 is only one example of an optical component that may be housed within the module 12 of the present disclosure, and in other embodiments, the module 12 may be configured to house other types of optical equipment such as fan-outs, wavelength division multiplexer/demultiplexers, combiners, filters, etc. As will be discussed in further detail below, according to certain embodiments, the module 12 may be provided with removable inserts that are customized based on the type of fiber optic equipment that is going to be housed within the module 12 and the corresponding cable routing provided within the module 12. The inserts may be sized and configured to accommodate the different types of fiber optic equipment and may include pre-mounted or pre-molded cable management structures such as radius limiters or spools that are designed in accordance with the cable routing needed for the types of fiber optic equipment provided in the module 12.

Figure 4:
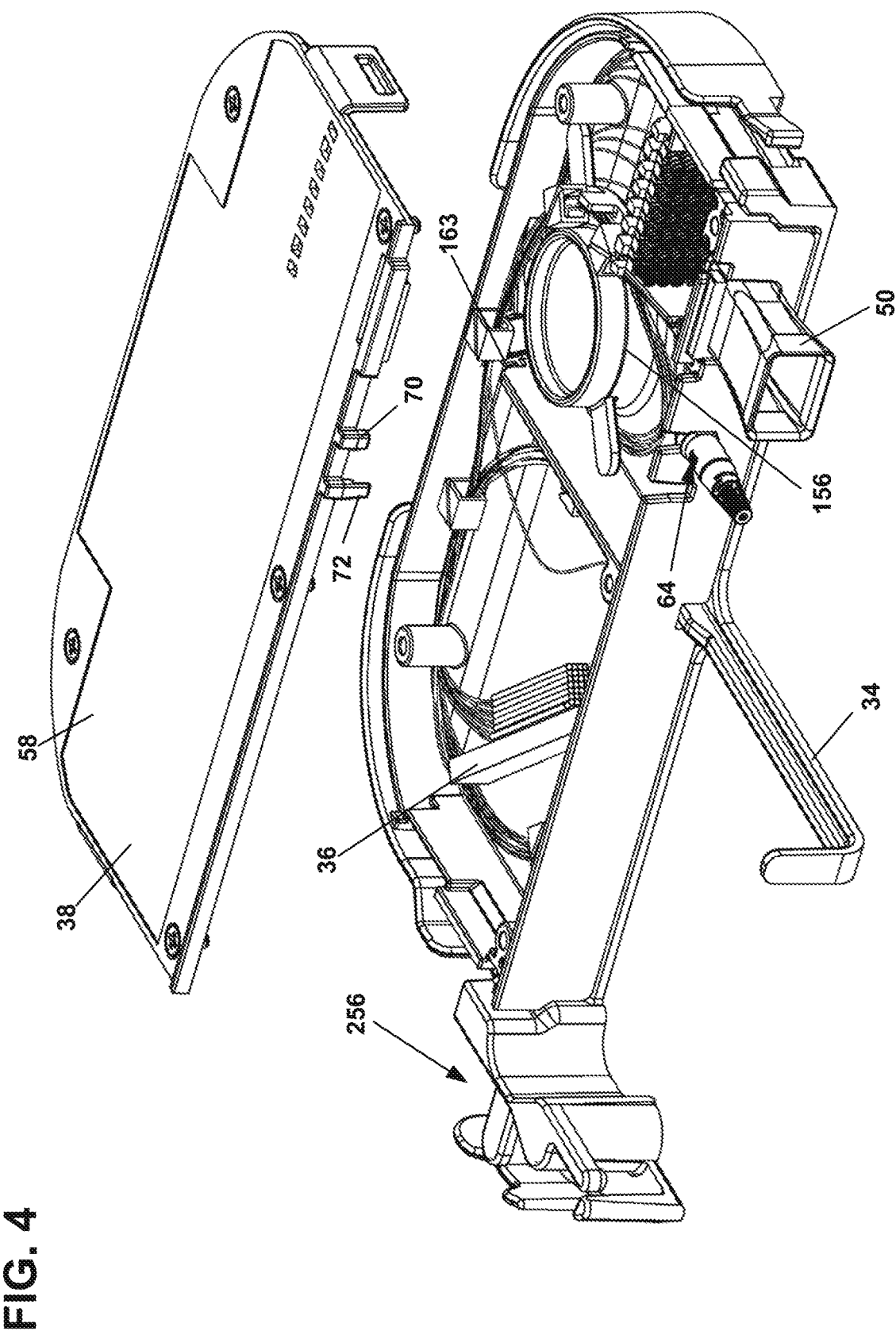
FIG. 4 illustrates the telecommunications assembly of FIG. 1 with the cover of the module removed from the main housing portion of the module housing.

The telecommunications module 12 includes the module housing 24 that is made up of the main housing portion 22 and a removable cover 38 (shown in an exploded configuration in FIG. 4). The cover 38 may be mounted to the module main housing portion 22 via fasteners 40 as shown in FIGS. 4 and 5.

Figures 5, 5A:
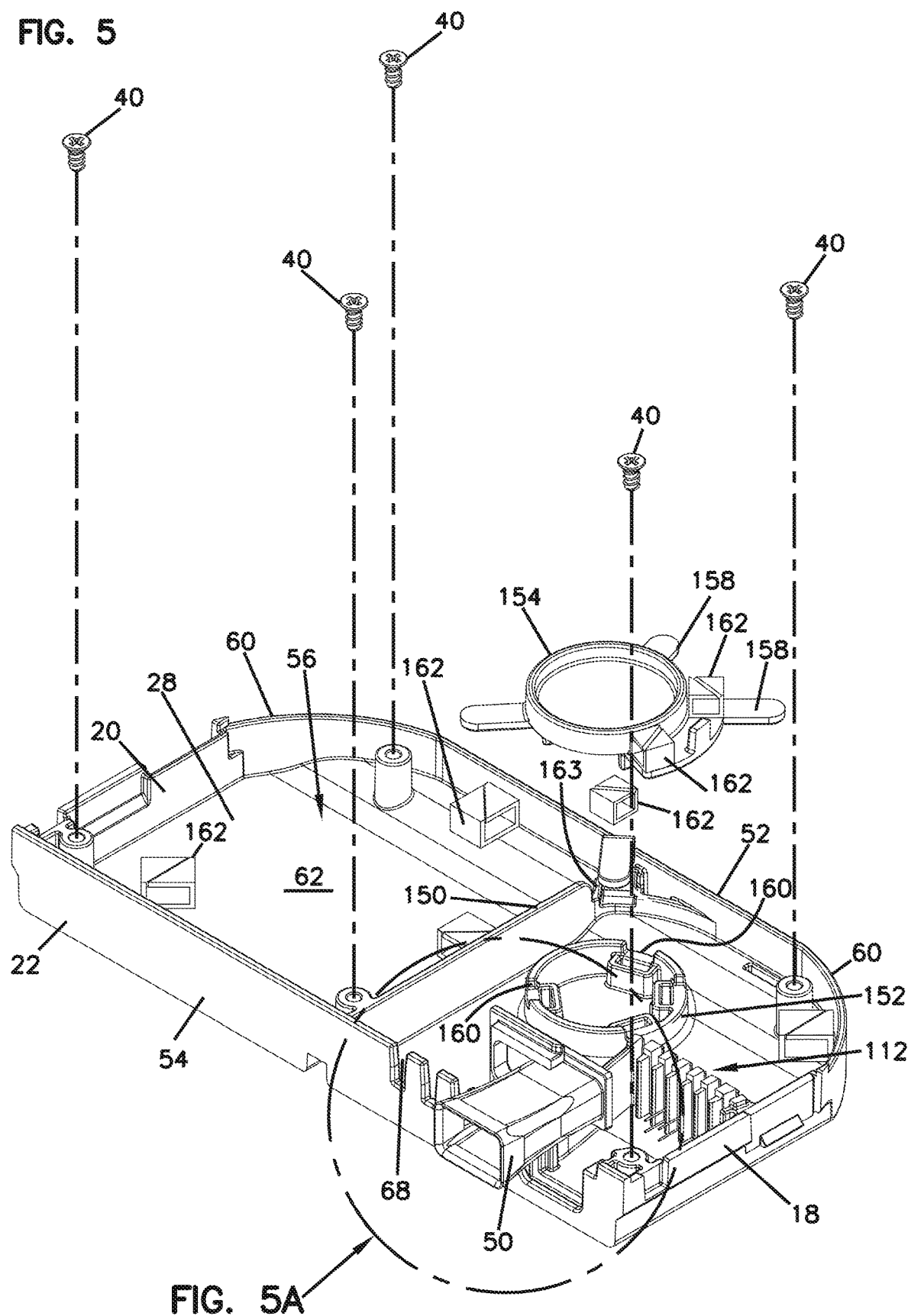
FIG. 5 illustrates the main housing portion of the module housing of FIG. 4 with a number of features exploded from the main housing portion, the module shown without any optical components or associated cabling therein.
FIG. 5A is a close-up view of the cable exit portion of the module of FIG. 5.
Figure 5A:
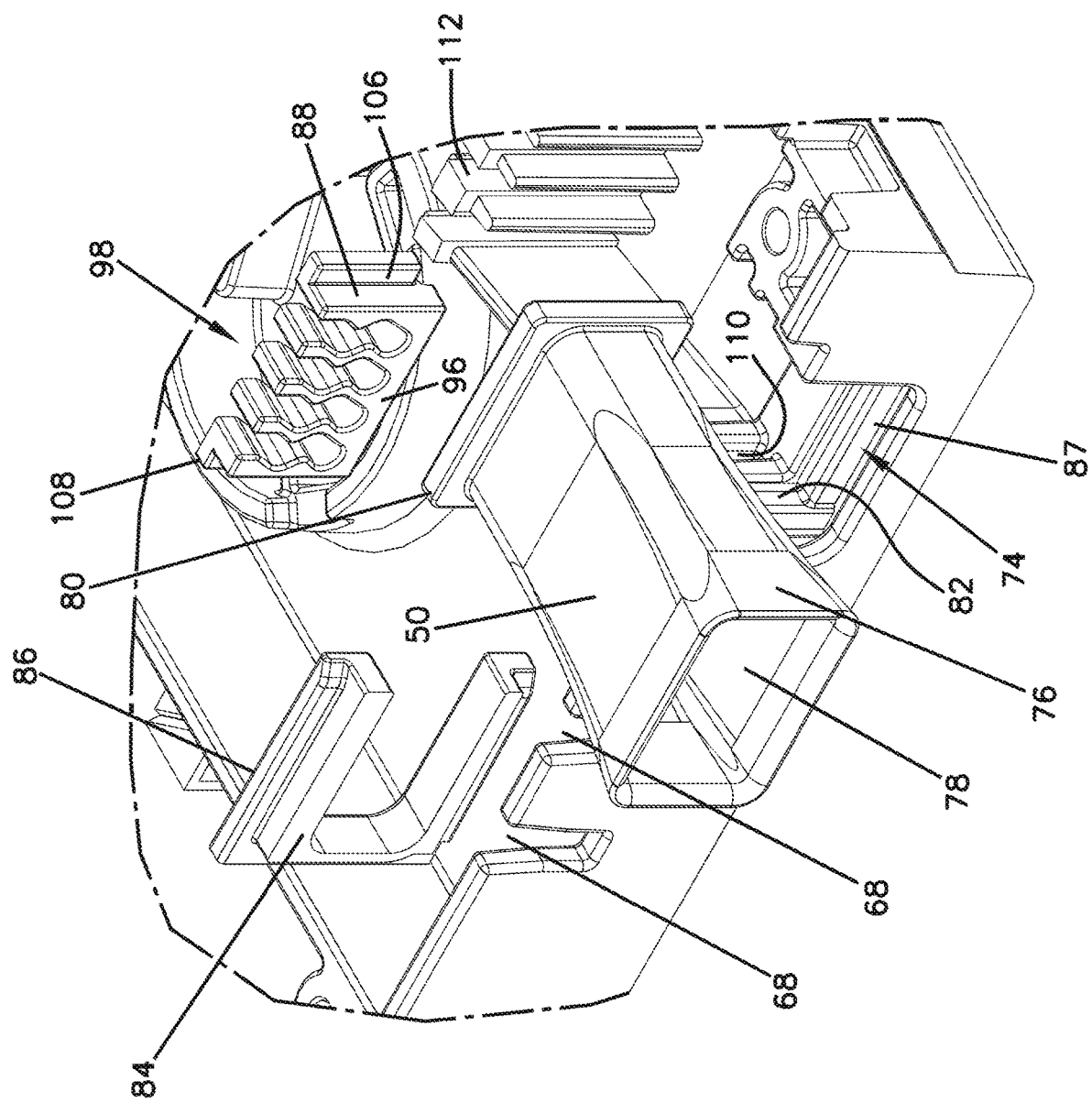

In FIGS. 5 and 5A, the main housing portion 22 of the module housing 24 is shown in an exploded orientation.

Figure 2:
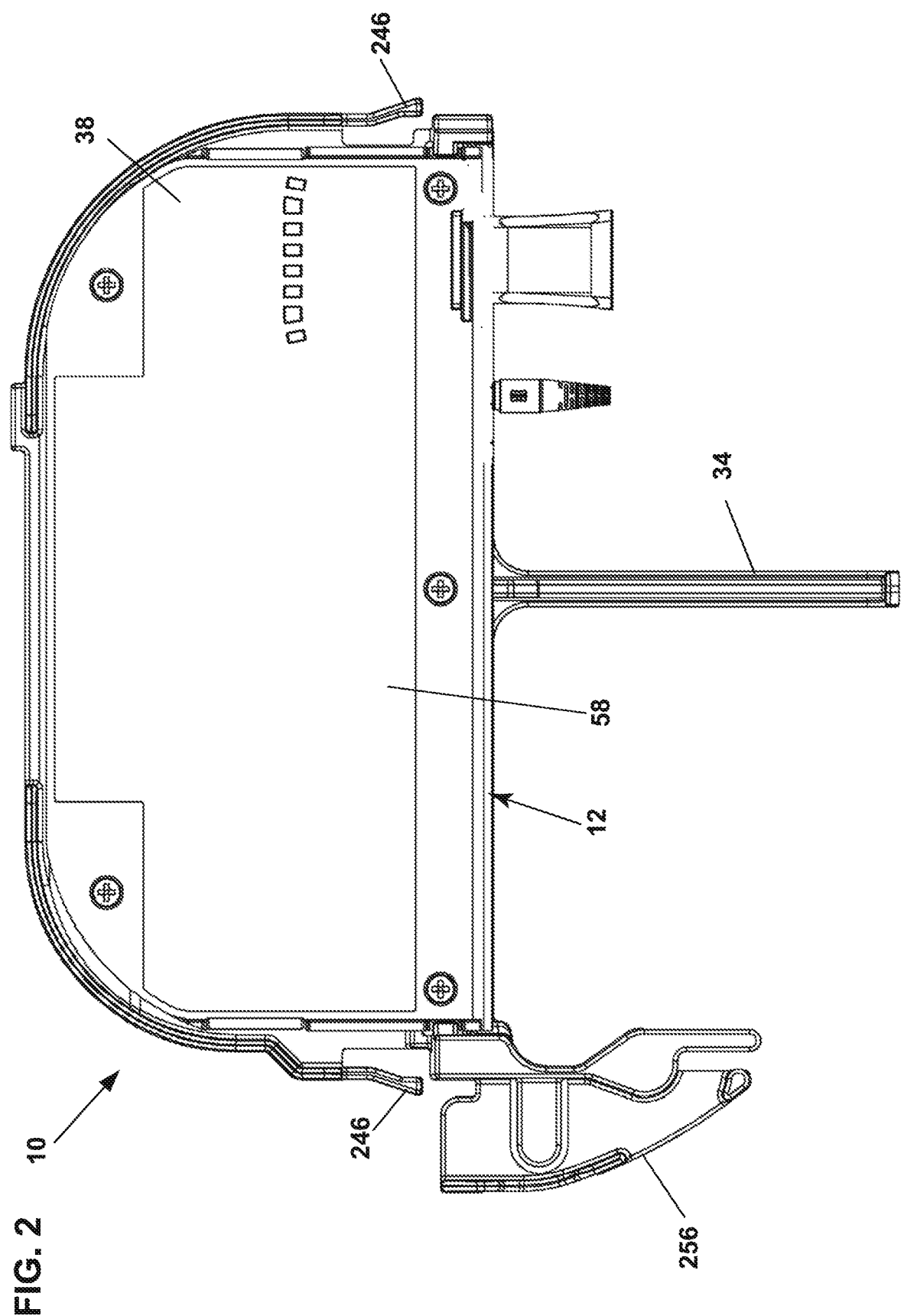
FIG. 2 illustrates the telecommunications assembly of FIG. 1 from a top view.
Figure 3:
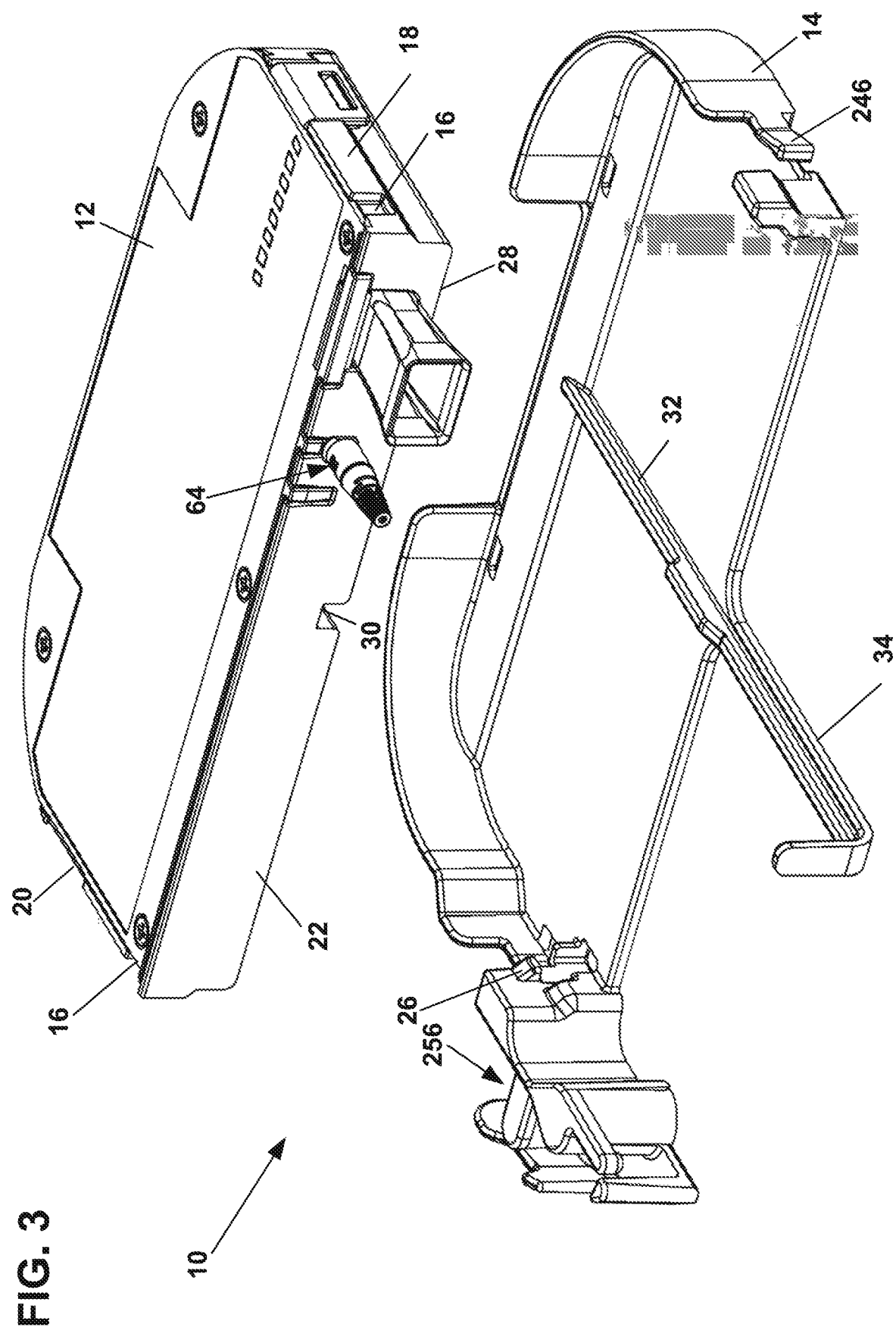
FIG. 3 illustrates the telecommunications assembly of FIG. 1 with the module exploded off the tray.

The main housing portion 22 and the removable cover 38 of the module 12 are illustrated in a fully assembled configuration in FIGS. 1-3. The main housing portion 22 of the module housing 24 is shown without the optical equipment and associated cabling in FIGS. 5, 5A, and 6. In FIGS. 7 and 8, the module 12 is shown fully populated with these features.

Still referring to FIGS. 5-13, in the given embodiment, the module 12 is depicted as being configured to house an optical component in the form of a fiber optic splitter 36. The fiber optic splitter 36 is adapted to power split a first input fiber optic signal entering the module 12 into multiple strands that are output as connectorized pigtails 42 from the module 12. In the embodiment shown, the fiber optic splitter 36 is a 1×32 splitter. As such, the module 12 of the present disclosure is illustrated as outputting 32 output signals via fiber optic pigtails 42 for every input signal entering the module 12. As shown and as will be discussed in further detail, an outer layer (e.g., a strength layer 44) of the cabling 46 carrying the input signal, and an outer layer (e.g., a strength layer 48) of the cabling (e.g., pigtails) 42 carrying the output signals may be fixed to the module housing 24 via crimping so as to still allow the internal fibers to move through the walls of the module housing 24 for accommodating thermal expansion.

Figure 6:
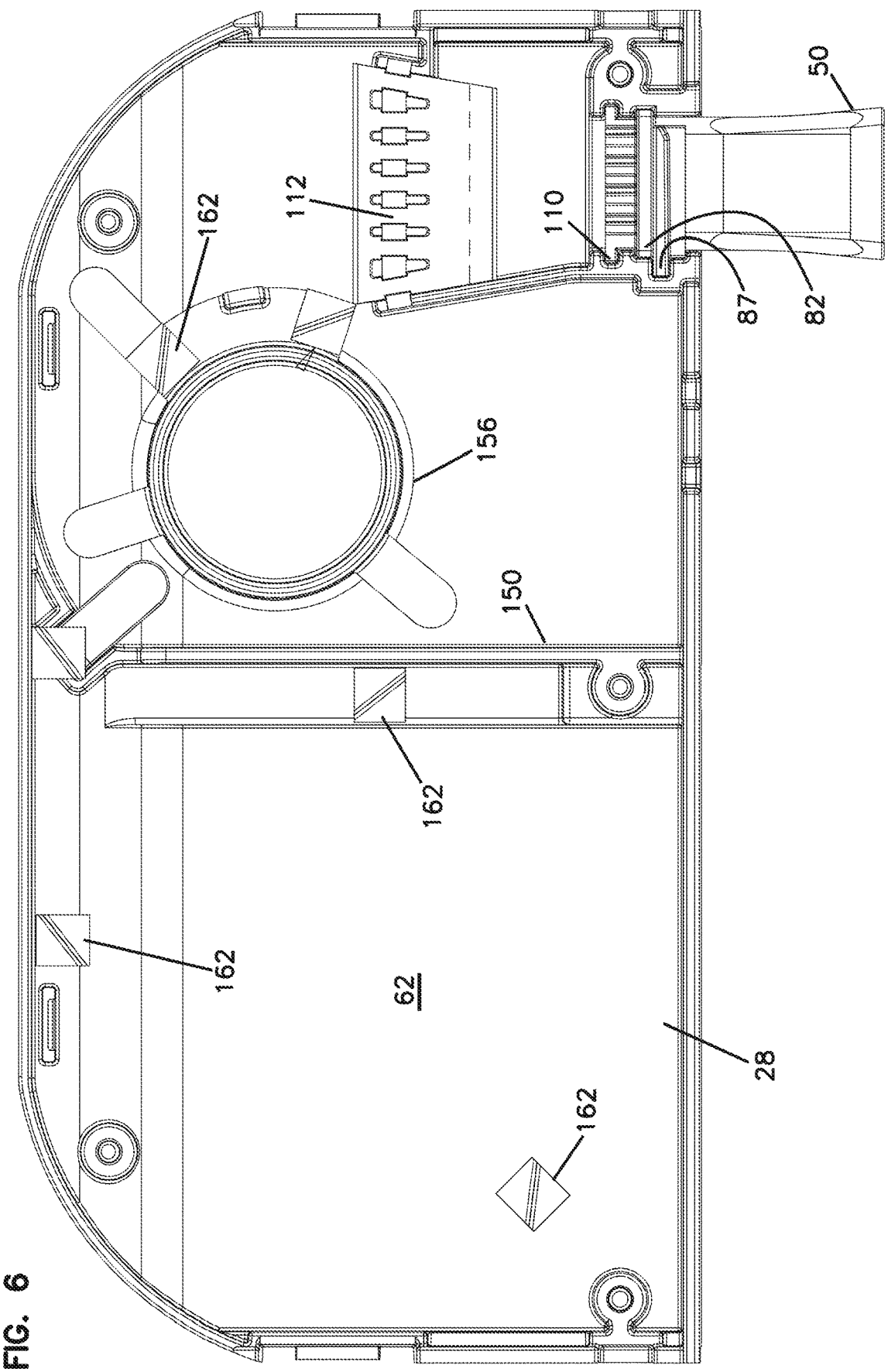
FIG. 6 illustrates the main housing portion of FIG. 5 from a top view wherein all of the features thereof are in an assembled configuration.
Figure 7:
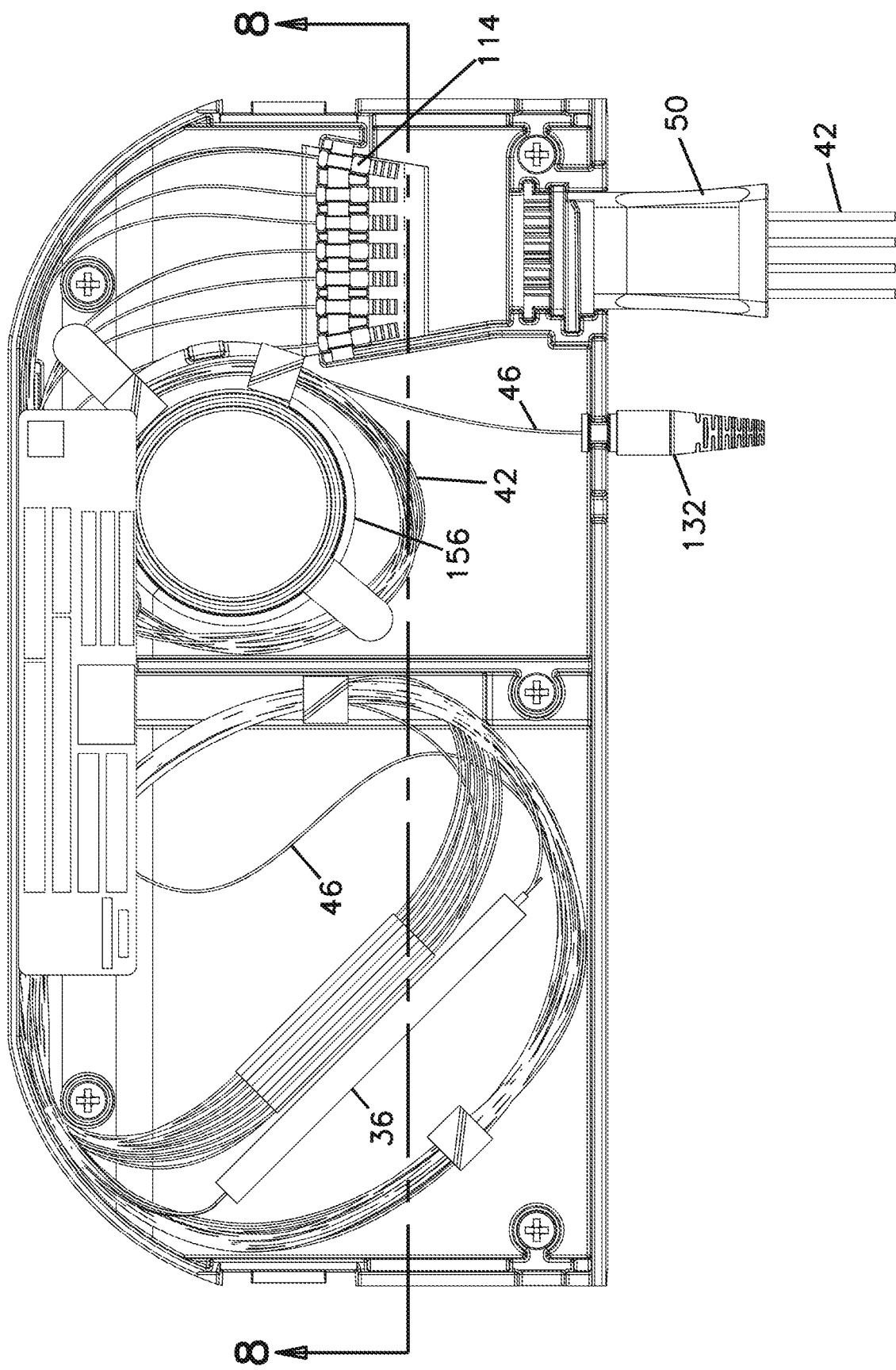
FIG. 7 illustrates the main housing portion of FIG. 5 in a fully populated configuration with the optical component and the cabling therein.
Figure 9:
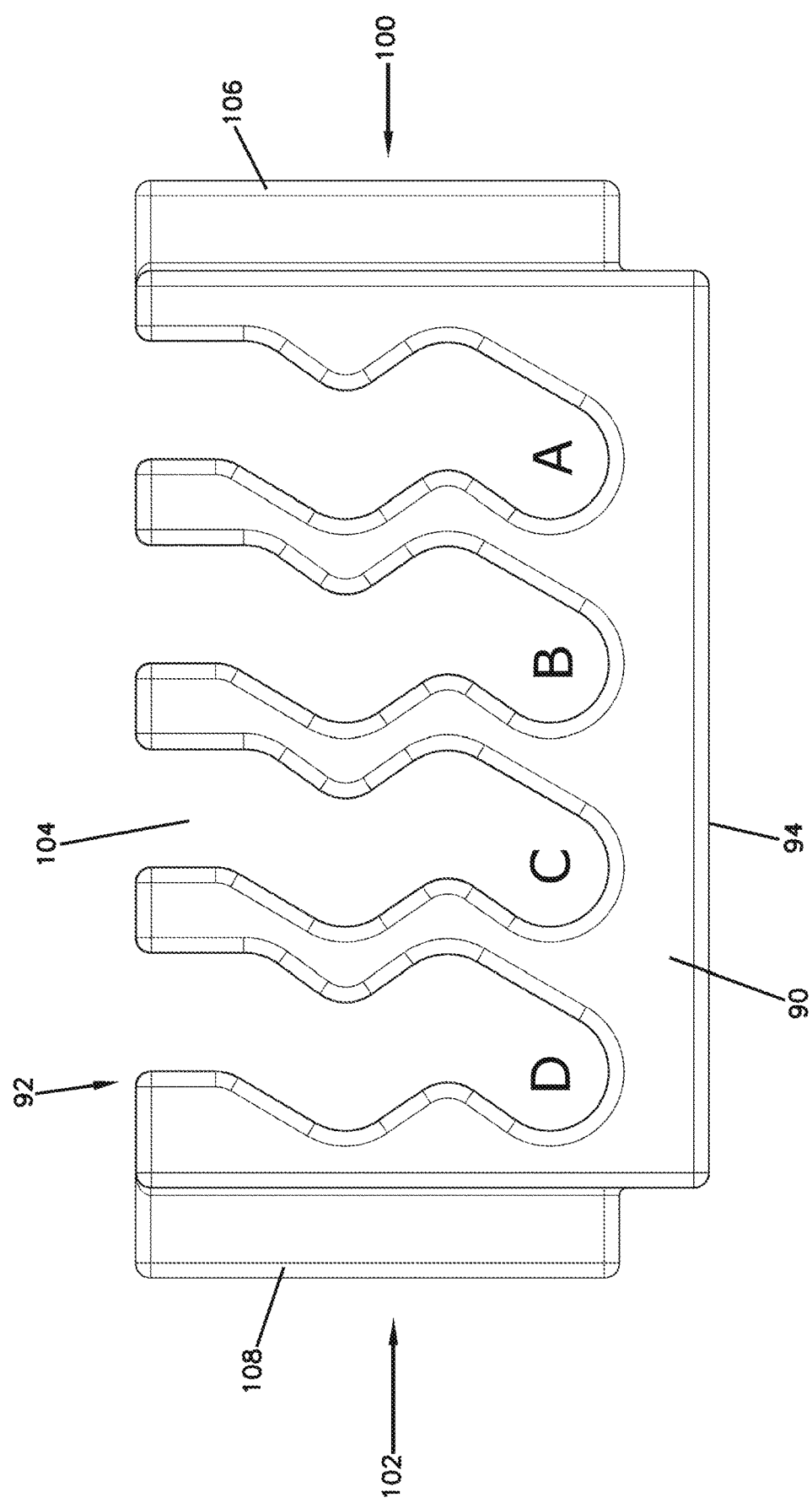
FIG. 9 illustrates a front view of the insect-infestation prevention device of the module of FIG. 8 in isolation.

Now referring specifically to FIGS. 5, 5A, and 6, the main housing portion 22 of the housing 24 of the fiber optic splitter module 12 is illustrated. The cover 38 of the fiber optic splitter module housing 24 has been removed, exposing the interior features of the fiber optic splitter module 12 including an example cable routing associated with a splitter 36 within the fiber optic splitter module 12.

The main housing portion 22 defines the bottom wall 28 extending between the right wall 18, the left wall 20, a rear wall 52, and a front wall 54. As noted above, the open side 56 of module main housing 22 is normally closed by a removable cover 38 that defines a top wall 58 of the module housing 24.

Rear wall 52 of main housing portion 22 includes curved portions 60 that are configured to provide bend radius protection and routing guidance to cables 42, 46 within an interior 62 of the module 12. The front wall 54 of module main housing portion 22 is configured to provide the signal input and the signal output locations 64, 66 of the module 12. The depicted module 12 includes two signal input openings 68 at the front wall 54. The signal input openings 68 of the front wall 54 are normally covered by downwardly protruding tabs 70 of the cover 38. The protruding tabs 70 may include breakable portions 72 for exposing one or more of the signal input openings 68 for utilizing the opening as a signal input location 64 (please refer to FIG. 4).

The depicted module 12 also defines a signal output or a cable exit opening 74 at the front wall 54, adjacent the signal input openings 68. The module 12 is configured to receive a bend limiting apparatus 76 at the signal output opening 74 that extends outwardly from the front wall 54. The bend limiting apparatus 76 is in the form of a boot 50 and is configured to provide bend protection to the plurality of pigtails 42 carrying the output signals exiting the module 12.

The boot 50 defines a central opening 78 aligned with the cable exit opening 74 for routing the pigtails 42 out of the module 12. The boot 50 is slidably mounted to main housing portion 22 and is configured to be captured by the cover 38 of module 12 when cover 38 is mounted to main housing portion 22.

According to the depicted embodiment, in order to facilitate placement and/or removal of the flexible boot 50, the cable exit opening 74 defined by the main housing portion 22 is configured such that the boot 50 can be axially slid over the pigtails 42, brought toward the module 12 from an exterior of the module 12, and placed at the cable exit opening 74, wherein a cable passage defined by the central opening 78 of the boot 50 aligns with the cable exit opening 74. In the depicted embodiment, a rear lip or flange 80 of the boot 50 can be inserted through the cable opening 74 and then slidably placed within a first notch 82 defined at the cable opening 74. Once the rear lip 80 of the boot 50 has been placed within the first notch 82, a separate boot retainer 84 in the form of a C-shaped clip is slidably placed over the boot 50 in a direction transverse to the axial direction. The boot retainer 84 defines a flange 86 that is slidably placed within a second notch 87 defined in front of the first notch 82. Once positioned, the flange 86 defined by the boot retainer 84 abuts, on one side, an inner side of the front wall 54 surrounding the cable exit opening 74. And, the flange 86 defined by the boot retainer 84 also abuts, on the opposite side, the lip 80 of the boot 50 to prevent the boot 50 from being pulled out in the axial direction. The cover 38 of the module housing 24 is placed on the main housing portion 22 and captures the boot retainer 84 against the main housing portion 22 to prevent the boot 50 from being pulled out.

According to the depicted embodiment, the fiber optic splitter module also includes at least one insect-infestation prevention device 88 that is configured to be placed at the cable exit opening 74. The insect-infestation prevent device 88 is shown in isolation in FIG. 9. The cover 38 of the module 12 includes structure for capturing the insect-infestation prevention device 88 within the main housing portion 22 of the fiber optic splitter module housing 24, as will be described in further detail.

The insect-infestation prevention device 88 is configured to be mounted adjacent the front cable exit opening 74 of the main housing portion 22, aligning with the boot central opening 78. As shown, the insect-infestation prevention device 88 includes a one-piece molded body 90 defining a top end 92, a bottom end 94, a front end 96, a rear end 98, a right side 100 and a left side 102. The body 90 includes cutouts 104 extending from the top end 92 toward the bottom end 94. The cutouts 104 are configured to receive fiber optic cables in a direction from the top end 92 toward the bottom end 94. In the depicted embodiment, the cutouts 104 each include a zig-zag configuration (a.k.a., an S-shaped configuration). The zig-zag configuration is designed to increase the density of the cables that can be stacked in the cutouts 104. For example, in the depicted embodiment, the zig-zag configuration allows a cutout 104 to accommodate four fiber optic cables stacked on top of each other, whereas straight slots would require a wider footprint for the cable manager or deeper cutouts. In other embodiments, depending upon the density required, the cutouts 104 could have straight slotted configurations.

The angles forming the zig-zag configuration of the cutouts 104 are designed such that, while providing a higher density for the cables, they also preserve bend radius properties of the fibers. When the insect-infestation prevention device 88 is aligned with the boot 50, the cutouts 104 are preferably sized to provide a snug fit with the output cables 42 such that any extra room around the cables 42 is limited to prevent insect-infestation. When less than all of the cutouts 104 or less than the entirety of a cutout 104 is used, the remaining space can be plugged using different types of inserts. For example, according to one embodiment, the remaining space that is not used for outputting a fiber can be plugged using a dummy fiber furcation tube assembly. The dummy fiber furcation tube assembly may include all of the components of a normal live fiber furcation tube assembly except for the fiber itself. An example of a dummy fiber furcation tube assembly is discussed in U.S. Pat. No. 8,824,850, the entire disclosure of which is incorporated herein by reference.

The rear end 98 of the body 90 of the insect-infestation prevention device 88 includes right and left flanges 106, 108. As shown in FIGS. 5, 5A, and 6, the insect-infestation prevention device 88 is slidably mounted at the cable exit opening 74, behind the boot 50, such that the right and left flanges 106, 108 are inserted into a third notch 110 defined adjacent the cable exit opening 74. Once the flanges 106, 108 are within the third notch 110, the front end 96 of the insect-infestation prevention device 88 lies flush with the rear end of the boot 50.

Once the insect-infestation prevention device 88, the boot 50, and the boot retainer 84 are placed on the main housing portion 22, the cover 38 is used to capture these components against the main housing portion 22.

As discussed previously, an outer layer 48 of the cables 42 exiting the module 12 through the boot 50 is fixed to the main housing portion 22 of the module 12 so as to allow expansion of the fiber through the cabling 42 due to thermal variances.

According to the depicted embodiment, the module 12 includes integrally formed crimp holders 112 (e.g., slots) within the interior 62 of the module housing 24 adjacent the front wall 54 thereof. Crimp elements 114 (see FIGS. 14 and 15) crimped to the output pigtail cables 42 are slidably received into the crimp holders 112. Crimp elements 114 include square flanges 116 between which are defined recessed portions 118. The crimp holders 112 include complementary structure to the crimp elements 114 such that once the crimp elements 114 are slidably inserted into the crimp holders 112, the crimp elements 114 are prevented from moving in a longitudinal direction due to the flanges 116. Once slidably inserted, crimp elements 114 are held in place by the cover 38 that is mounted on the module main housing 22. The crimp assembly 120 used for the output cables 42 is illustrated in FIGS. 14 and 15 and discussed in further detail below.

In the embodiment shown, there are seven crimp holding slots 112, each slot 112 being able to accommodate up to five crimp elements 114 (see FIGS. 8 and 8A). In the embodiment of the module 12 shown, since a 1×32 fiber optic splitter 36 may be used, the crimp holders 112 provide the capacity for all of the thirty-two crimp elements 114 connected to output cables 42. Since only thirty-two crimp holding positions are occupied, the remaining three positions may be filled with dummy crimp elements 122 or inserts/fillers that are not connected to cables, making sure the crimp elements 114 crimped to active output cables 42 do not slide out of the slots 112.

The configuration of the module housing 24 can certainly be modified to accommodate other number of inputs or outputs, as desired. In addition, other complementary shapes between the crimp elements 114, and the crimp holders 112 can be used to provide a slidable fit and to prevent axial movement of the crimp elements 114 within the crimp holders 112.

Figure 14:
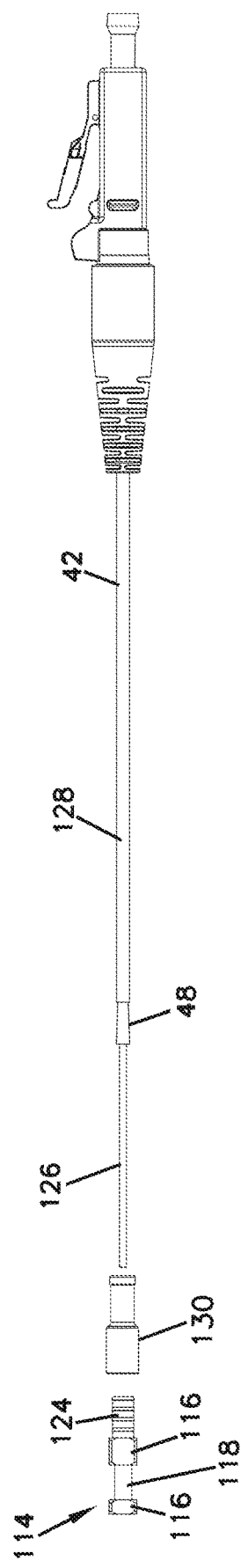
FIG. 14 illustrates an exploded view of an example of a crimp assembly (i.e., furcation tube assembly) that can be used with the output pigtails of the module of FIGS. 1-13.
Figure 15:
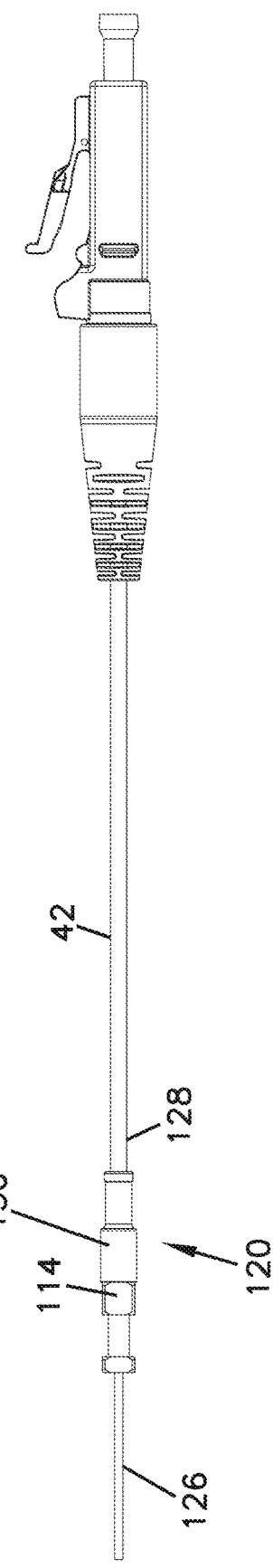
FIG. 15 illustrates the crimp assembly of FIG. 14 in an assembled configuration.

Referring now to FIGS. 14 and 15, one example of a crimp assembly 120 (i.e., furcation tube assembly) that can be used with the module 12 is illustrated. The crimp assembly 120 includes, as discussed above, a crimp element 114 that defines a front portion with a circumferential notch 118 (i.e., recessed portion) configured to slidably fit within one of the crimp slots 112 of the module 12 and a rear portion 124 configured to crimp a strength member 48 of the cabling 42. The crimp element 114 defines a central hollow opening through which an inner fiber bearing tube 126 extends. A strength member 48 is shown in FIG. 14 extending between the inner tube 126 and the outer tubing or jacket 128 of the cable 42. Strength member 48, as shown, is an aramid fiber such as Kevlar® but other suitable materials may also be used. Before crimping the strength member 48 to the crimp element 114, the strength member 48 is overlapped onto rear portion 124 of the crimp element 114. A crimp sleeve 130 is fit about the strength member 48 above the rear portion 124 of the crimp element 114 and is crimped to hold these elements together. The outer jacket 128 abuts against the rear end of the crimp sleeve 130.

Figure 16:
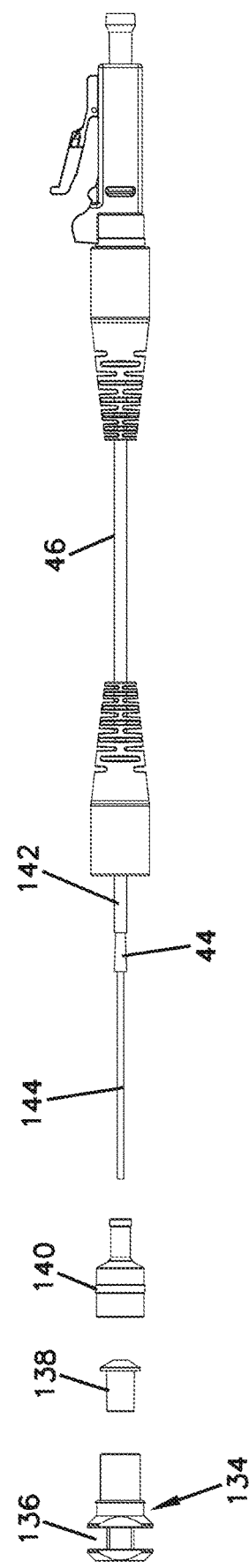
FIG. 16 illustrates an exploded view of an example of a crimp assembly (i.e., furcation tube assembly) that can be used with the input cabling of the module of FIGS. 1-13.
Figure 17:
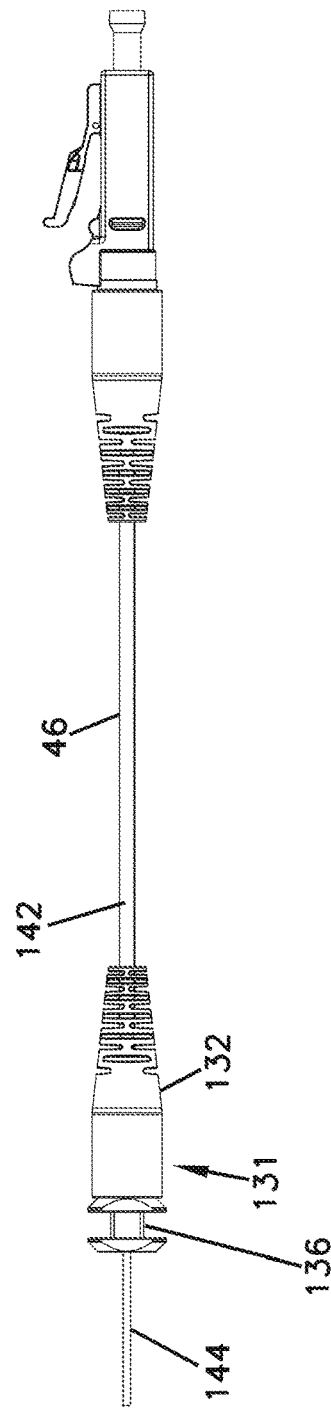
FIG. 17 illustrates the crimp assembly of FIG. 16 in an assembled configuration.

A similar crimp-based fixation assembly 131 is also provided for the signal input location 64. As shown in FIGS. 16 and 17, a strain relief boot 132 is provided that mates with a crimp element 134 for fixing the cabling 46 at the input location 64. The crimp element 134 defines a circumferential notch 136 (i.e., recessed portion). The circumferential notch 136 is slidably inserted into one of the signal input openings 68 defined on the front wall 54 of the main housing portion 22. The crimp element 134 of the input connection is captured by the cover 38 when the cover 38 is mounted on the main housing portion 22.

The crimp assembly 131 at the signal input location 64 further includes an insertion cap 138 that mounts inside a front end of the crimp element 134 and a crimp sleeve 140 that mounts around the exterior of the front end of the crimp element 134. The crimp element 134 is configured to receive, anchor, and provide strain relief/bend radius protection to the fiber optic cable 46 carrying the input signal. The input fiber optic cable 46 includes a jacket 142 surrounding a fiber bearing tube 144. The fiber optic cable 46 also includes the strength layer 44 formed by a plurality of strength members (e.g., reinforcing fibers such as aramid yarn/Kevlar®) positioned between the optical fiber tube 144 and the outer jacket 142. An end portion of the strength layer 44 is crimped between the crimp sleeve 140 and the exterior surface of the front end of the crimp element 134 so as to anchor the strength layer 44 to the crimp element 134. The crimp assembly 131 further includes the strain relief boot 132 mounted at the front end of the crimp element 134, over the crimp sleeve 140, for providing strain relief and bend radius protection to the optical fiber.

The insertion cap 138 reduces the size of the central opening of the crimp element 134 such that the outer tubing or jacket 142 of the cable 46 can abut against the cap 138 as the inner tubing 144 bearing the fiber is inserted through the crimp element 134.

Thus, the cable 46 carrying the input signal and the pigtails 42 carrying the output signals are both fixed to the module housing 24 while the fibers extending therethrough are allowed pass through the housing walls and expand and contract due to thermal variations. The module housing 24, thus, provides an expansion chamber effect for the incoming and outgoing fibers.

Now referring back to FIGS. 5-13, the interior 62 of the main housing portion 22 is divided into two halves or chambers 146, 148 (e.g., a right chamber 146 and a left chamber 148) by a divider wall 150. The right chamber 146 may be considered the cable management and expansion chamber, and the left chamber 148 may be considered the optical equipment or component holding chamber.

Toward the rear wall 52 within the right chamber 146 is positioned a cable management structure in the form of a spool 152 that is integrally formed with the bottom wall 28 of the main housing portion 22. A removably mounted cable retainer 154 is placed over the spool 152 so as to form a dual-layered cable management structure 156 as will be discussed in further detail below.

The cable retainer 154 defines circumferentially placed fingers 158 for retaining the cables around the dual-layered structure 156. When the cable retainer 154 is placed on the spool 152 that is integrally formed with the bottom wall 28 of the main housing portion 22, the fingers 158 fit within notches 160 on the spool 152 to create a dual-layered structure.

The left chamber 148 of the main housing portion 22 is configured to house optical equipment or components for the module 12. As noted above, the depicted module 12 is a fiber optic splitter module and a power splitter 36 is depicted as being housed within the left chamber 148.

It should be noted that the left chamber 148 provides enough spacing to directly mount different types of optical equipment, or, alternatively, receive molded inserts that may have features for mounting different types of optical equipment. In the embodiment shown, the fiber optic splitter 36 is shown as being directly placed within the left chamber 148.

Referring to FIGS. 7, 8, and 10-13, an example of a cable routing path going all the way from the signal input location 64 to the signal output location 66 will now be described, referring to the features of the module 12 that allow management or provide for bend radius protection for such cabling.

FIGS. 7 and 8 illustrate a fully populated module 12 showing all of the cabling associated with the input and output signals. FIGS. 10-13 illustrate the example routing in sequential steps to facilitate understanding of the routing within the module 12.

Figure 10:
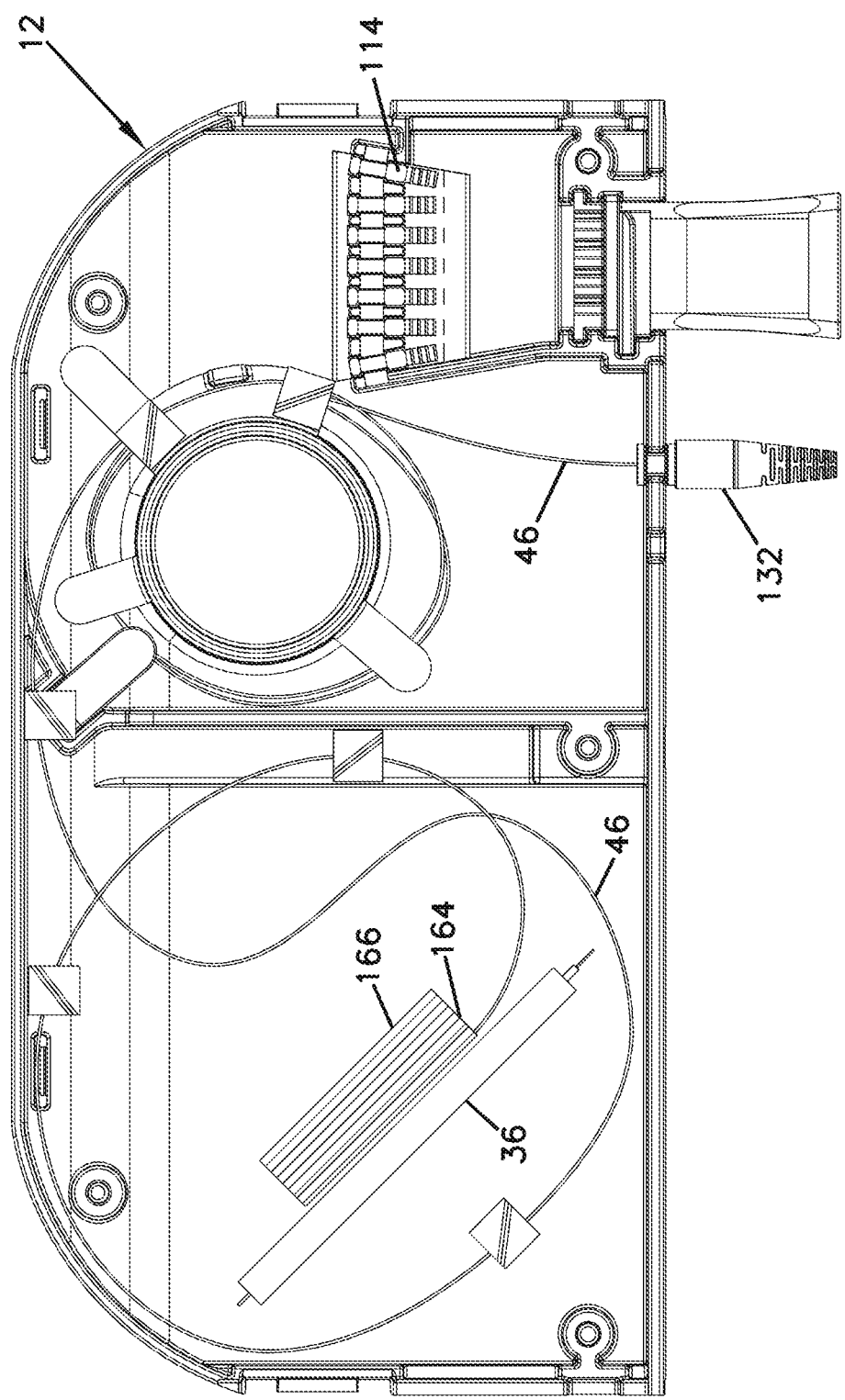
FIGS. 10-13 illustrate the sequential steps for routing cabling associated with an input signal that is split by a fiber optic splitter of the module into a plurality of output signals output from the module.

Now referring to FIG. 10, in the depicted example, a cable 46 carrying the input signal enters the module housing 24 through the signal input opening 68 at the front wall 54 of the main housing portion 22. That cable 46 is wrapped around the dual layer cable management structure 156 twice, with the final wrap ending up on the upper level of the cable management structure 156. The initial wrap of the cable 46 is around the lower portion of the cable management structure 156 that is integrally formed with the bottom wall 28 of the module housing 24, and this wrap allows expansion of the cable within the right chamber 146 of the module housing 24. When the cable 46 passes from the lower level to the upper level of the cable management structure 156, it is routed through a pair of cable holders 162 that limit movement of the cable 46 that is at the upper level of the cable management structure 156.

From the upper level of the cable management structure 156, the cable 46 passes over a notch 163 on the central divider 150 to the left chamber 148 of the module housing 24. After passing to the left chamber 148 of the module housing 24, the cable 46 is routed to follow an S-shaped path and initially extends all the way around the fiber optic splitter 36, through three other cable holders 162 (one being located toward the front and left corner of the module housing 24, the second being located adjacent the rear wall 52 of the housing 24, and the third being located adjacent the divider 150) before being spliced to the splice input side 164 of a splice area 166.

Figure 11:
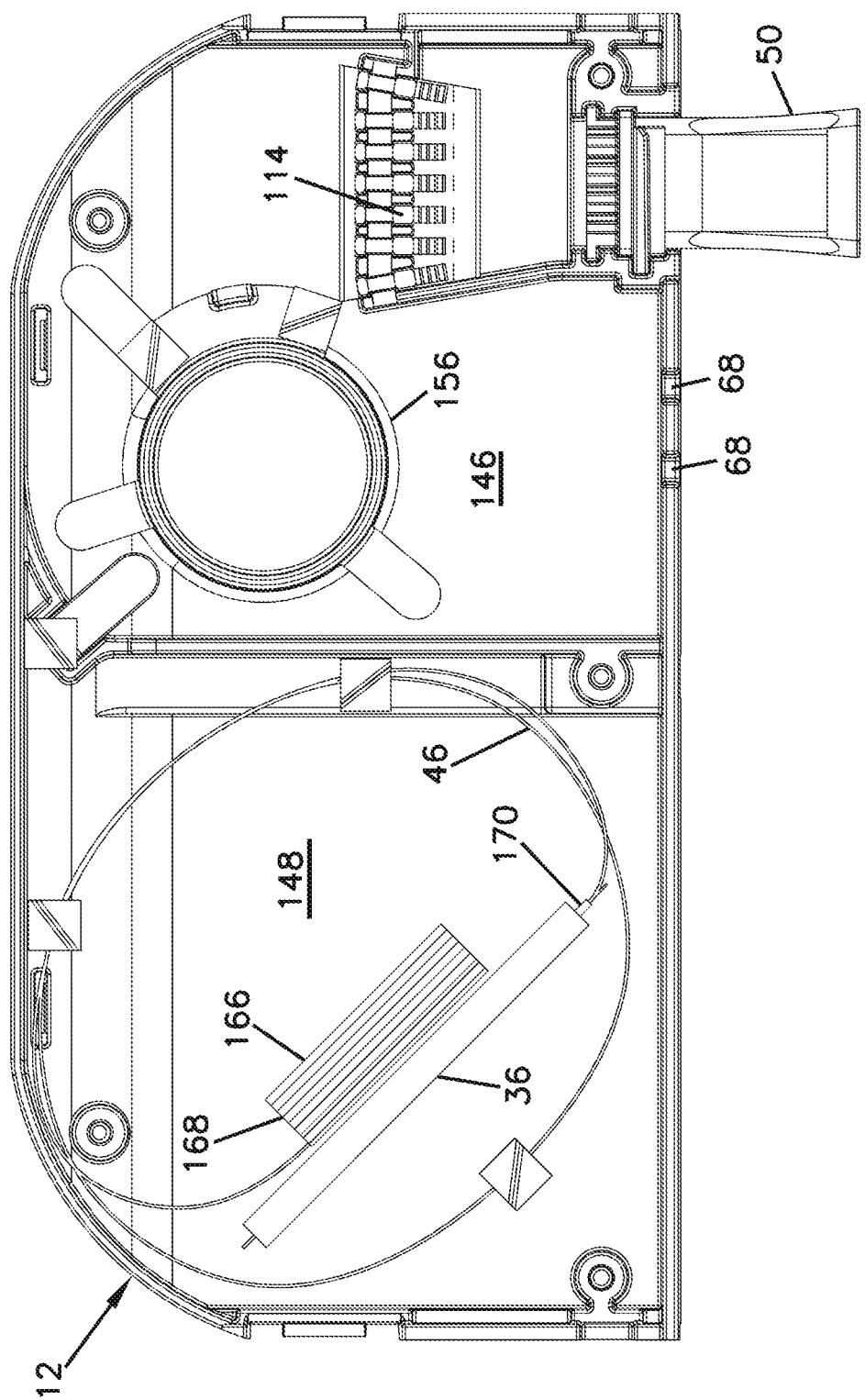

Referring now to FIG. 11, from the splice output side 168 of the splice area 166, the cable 46 carrying the input signal is then routed again all the way around the fiber optic splitter 36 in the left chamber 148, passing through the three cable holders 162, before entering the splitter input side 170 of the fiber optic splitter 36.

Figure 12:
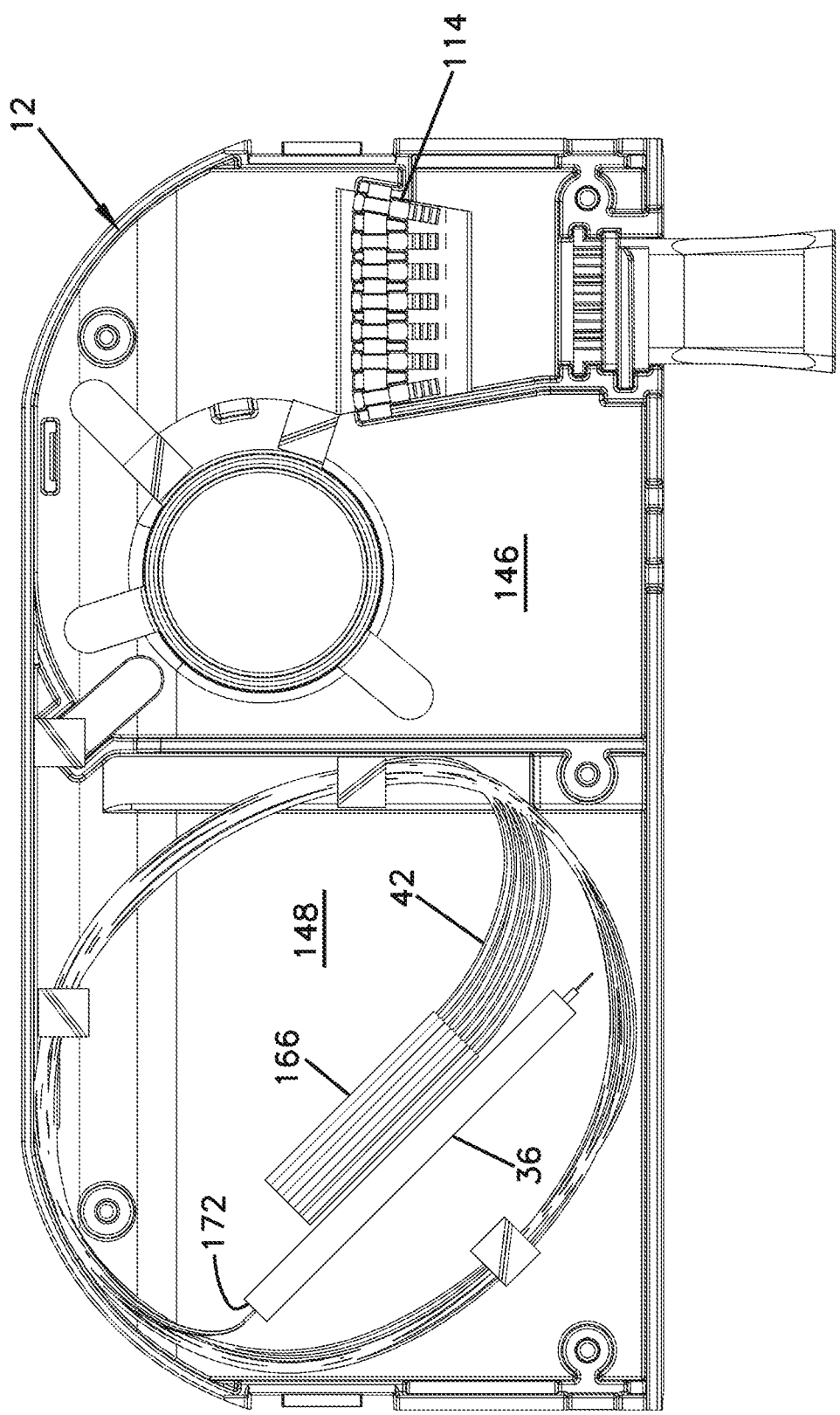

FIG. 12 illustrates the cable routing for the cables 42 that are output from the splitter output side 172 of the fiber optic splitter 36. As shown in FIG. 12, after the cables 42 carrying the output signal leave the output side 172 of the splitter 36, the cables 42 are routed all the way around the left chamber 148, passing through the three cable holders 162, before being led to the splice input side 164 of the splice area 166.

Figure 13:
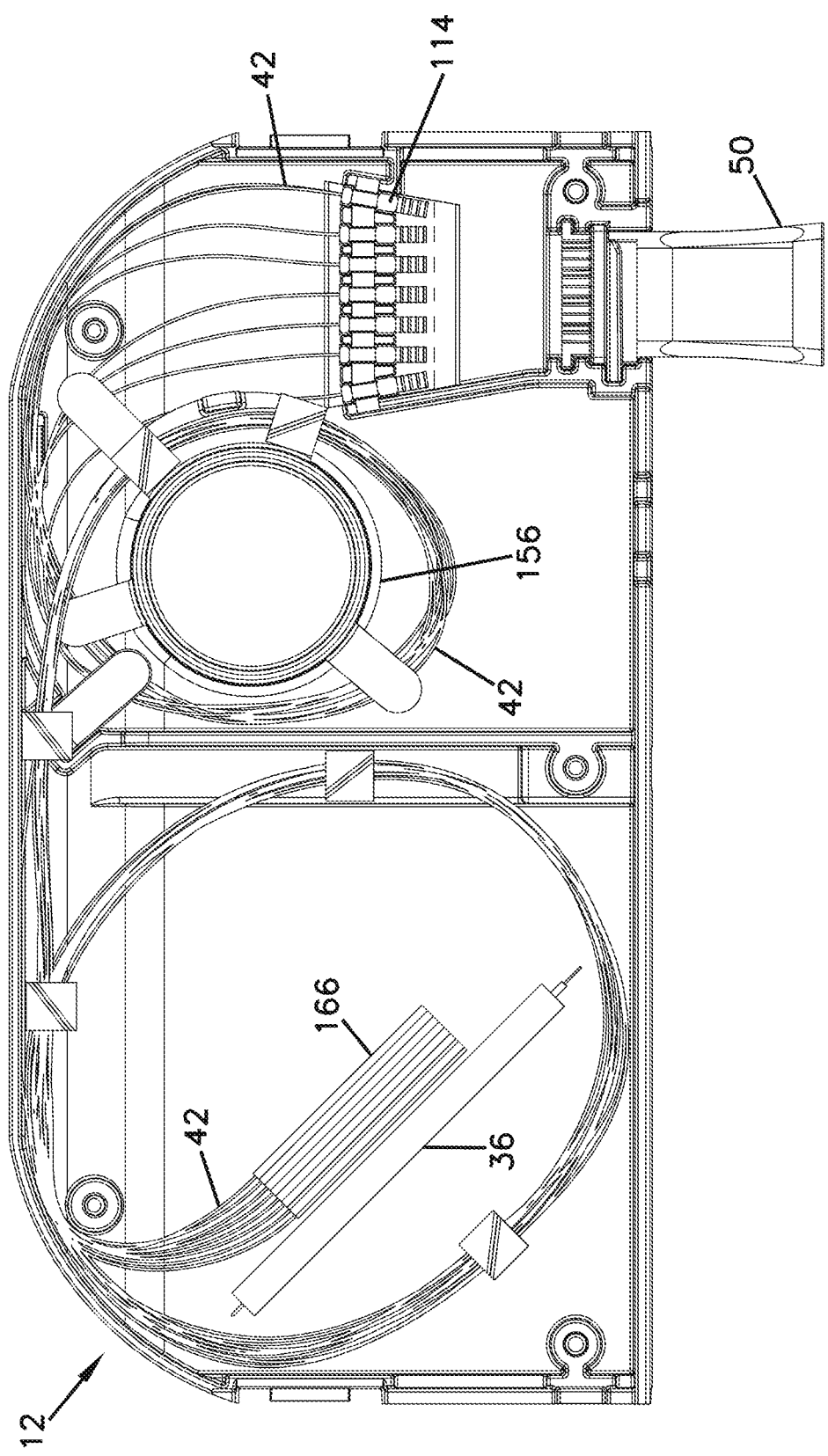

Now referring to FIG. 13, after being spliced to cabling 42 carrying the output signal, the cables 42 are lead from the splice output side 168, all the way around the left chamber 148 again, toward the right chamber 146 of the module housing 24. The cables 42 pass over the divider 150 and are then routed around the cable management structure 156 before being led to the crimp holders 112. As discussed previously, the cables 42 carrying the output signal are crimped via crimp elements 114, and the strength members 48 thereof are fixed to the module housing 24 at the crimp area, before being led out as pigtails 42 from the cable exit boot 50.

FIGS. 7 and 8, as discussed above, show the entire routing for all of the cabling carrying the input and output signals within the module 12.

It should be noted that the depicted cable routing configuration is simply one example of a configuration that can be used within the module 12 given the optical components used therein. Depending upon the type of optical components used within the module 12, the cable management features associated with possible inserts that are configured to hold such components, or the number of signal input openings utilized, the cable routing for the module 12 can be varied.

Now referring to FIGS. 18-37, various examples of telecommunications fixtures such as telecommunications chassis/frames that are configured to receive assemblies similar to the telecommunications assembly 10 described above are illustrated.

Referring now specifically to FIGS. 18-27, a first embodiment of a telecommunications frame 200 that is configured to receive assemblies similar to the telecommunications assembly 10 is illustrated. In FIGS. 28-37, a second embodiment of a frame 300 having features that are similar to the frame 200 of FIGS. 18-27 is illustrated, the frame 300 of FIGS. 28-37 providing a larger connection capacity than the frame 200 of FIGS. 18-27. As shown, the frame 300 of FIGS. 28-37 defines a taller profile providing for a larger number of levels for receiving assemblies 10 than the frame 200 of FIGS. 18-27.

Either frame 200, 300 may be provided as an underground telecommunications fixture or may be provided as an above-ground fixture that can be mounted on vertical surfaces such as a telecommunications pole 400 (as illustrated in FIGS. 26-27 and 36-37).

It should be noted that, other than the size difference, the frame 200 of FIGS. 18-27 is similar in configuration and function to that of the frame 300 of FIGS. 28-37, and, unless specifically distinguished, the features of the frame 200 of FIGS. 18-27 are fully applicable to the features of the frame 300 of FIGS. 28-37. Thus, the inventive features of the present application will be described with reference to only the frame 200 of FIGS. 18-27.

Referring now specifically to FIGS. 18-27, the frame 200 defines a cable seal portion 202 toward the bottom thereof that defines a plurality of openings 204 for sealably receiving large bundle cables 206. It should be noted that the bundle cables 206 entering the frame 200 may include both feeder (i.e., input) and distribution (i.e., output) cables 208 carrying the respective signals. In the depicted embodiment, three openings 204 are illustrated for receiving three bundle cables 206 carrying a plurality of input and/or output individual cables 208. Other number of openings 204 can be utilized depending upon the desired connectivity.

As will be discussed in further detail below, the outer perimeter of the cable seal portion 202 is configured to intermate with a cover/dome 210 and, with the use of a clamp 212, form an enclosure 214. The cover 210 is illustrated in FIGS. 24-27.

A module mounting portion 216 of the frame 200 extends upwardly from the cable seal portion 202 and defines a housing 218 that is configured to receive assemblies similar to the telecommunications assembly 10 discussed above, wherein such assemblies are formed from a telecommunications module similar to module 12 that has been mounted within a tray similar to tray 14.

Figure 18:
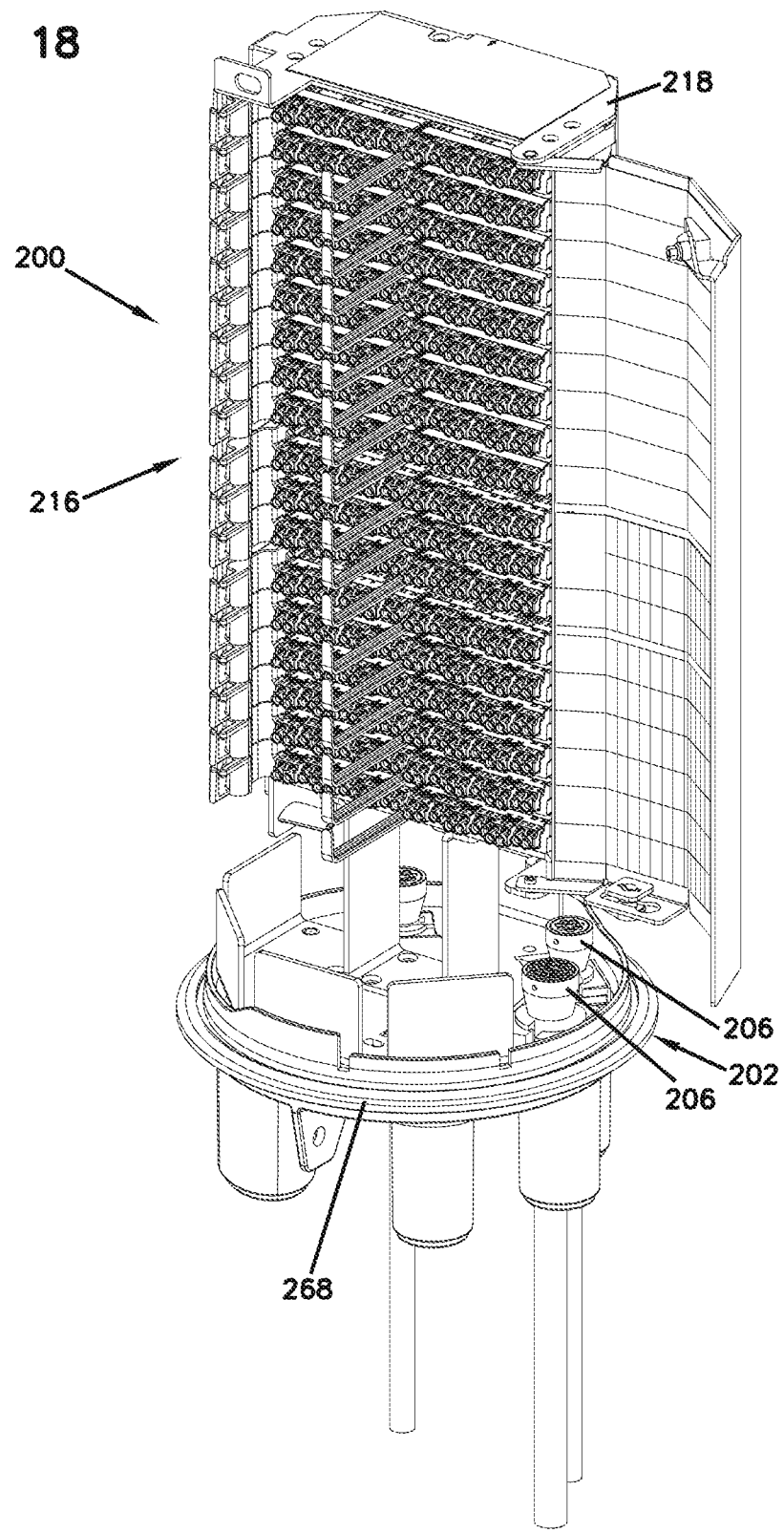
FIG. 18 is a front perspective view of a telecommunications chassis/frame configured to receive a plurality of the telecommunications assemblies of FIGS. 1-13, the chassis shown populated with a plurality of telecommunications assemblies and shown in an open access position.
Figure 19:
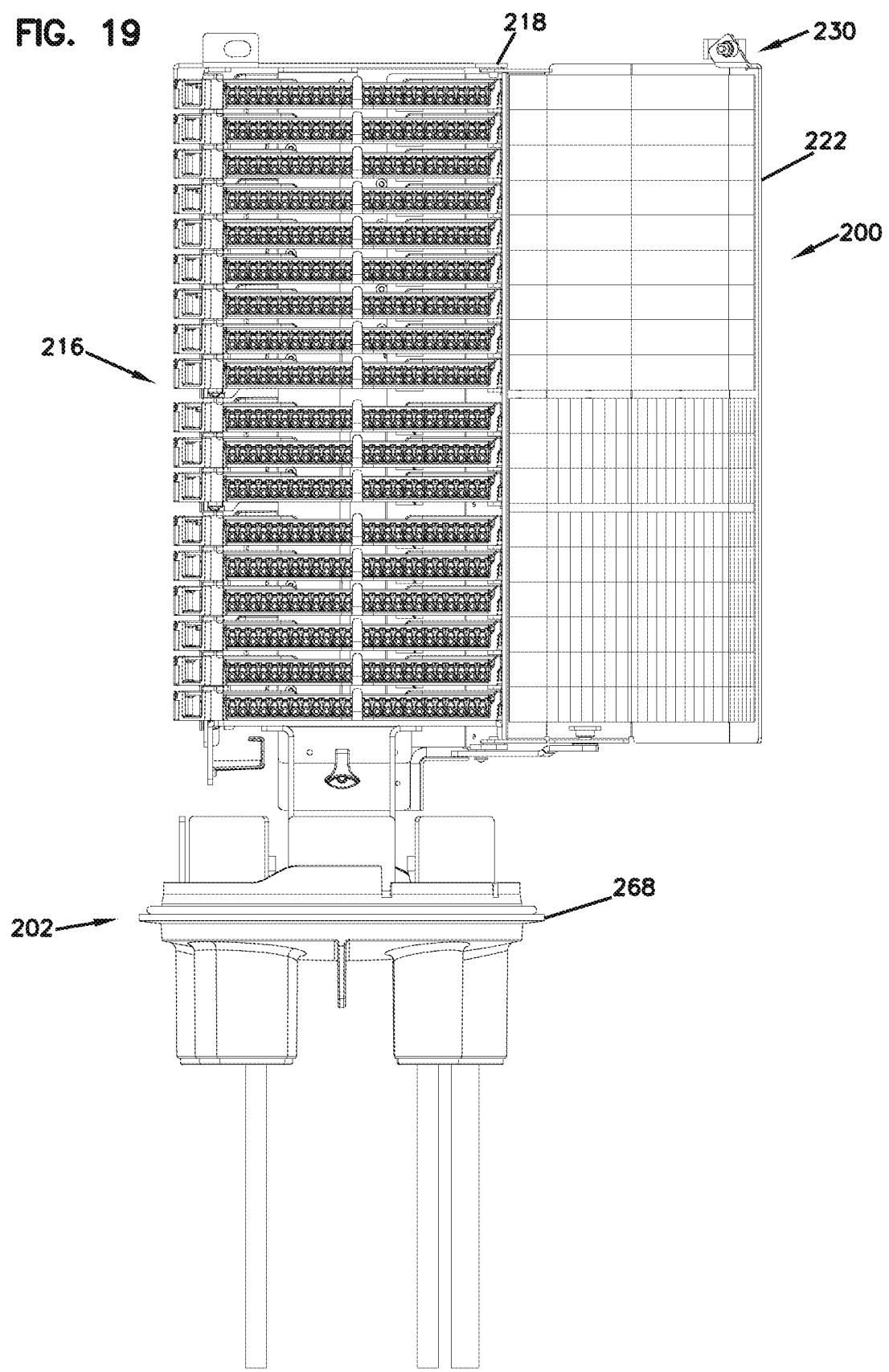
FIG. 19 is a front view of the telecommunications chassis/frame of FIG. 18.
Figure 20:
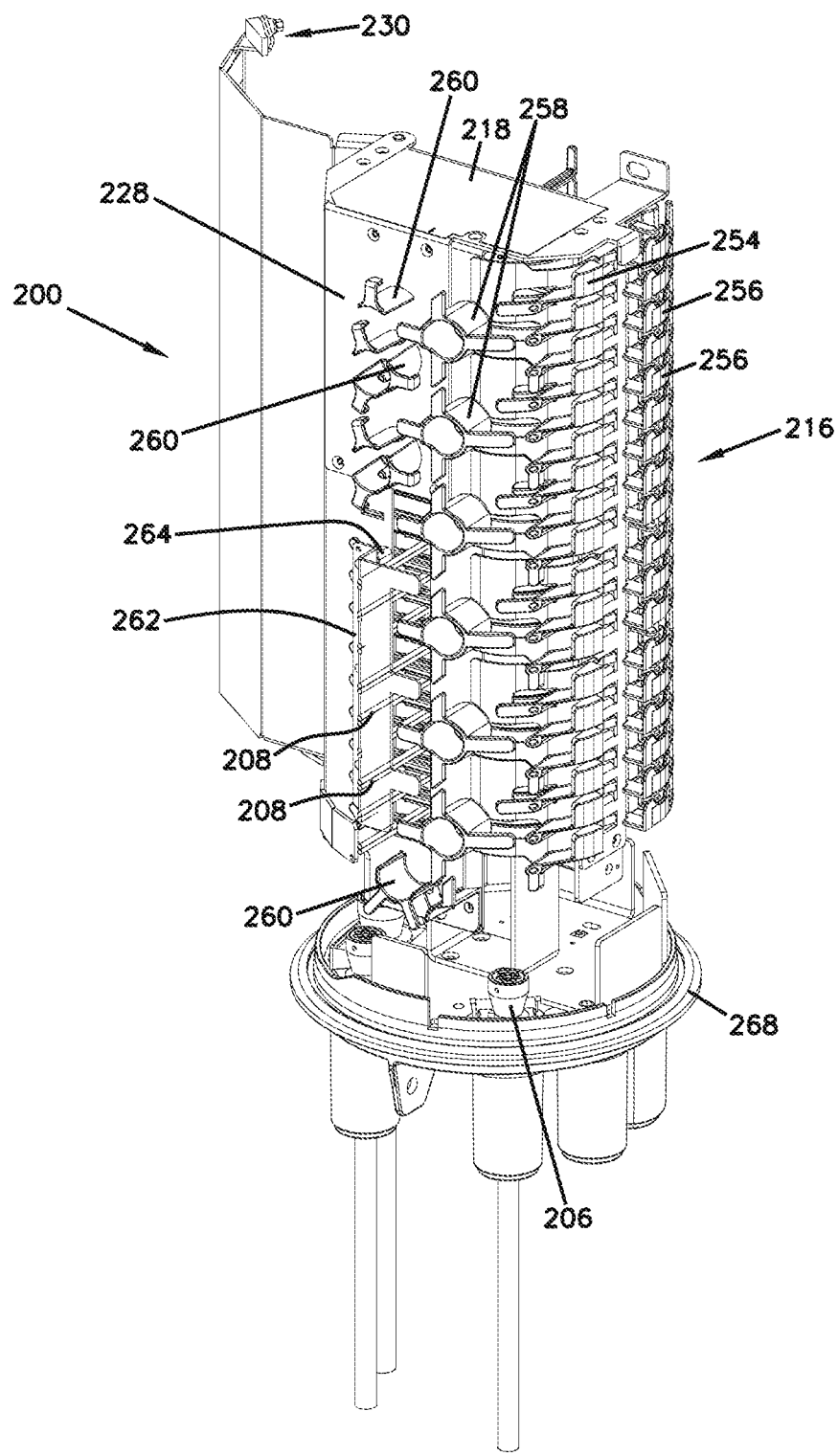
FIG. 20 is a rear perspective view of the telecommunications chassis/frame of FIG. 18.
Figure 21:
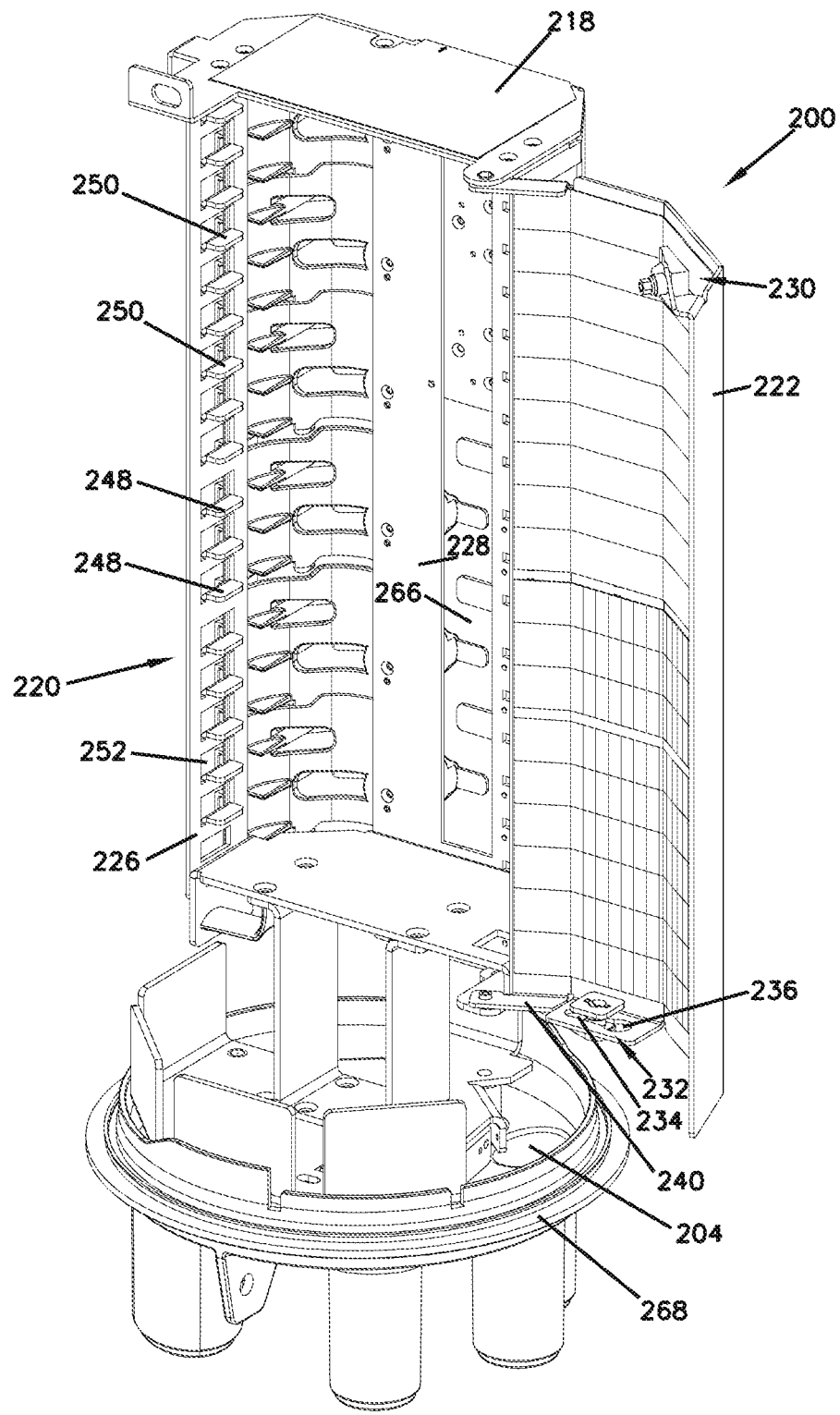
FIG. 21 illustrates the chassis/frame of FIG. 18 in an empty configuration.
Figure 22:
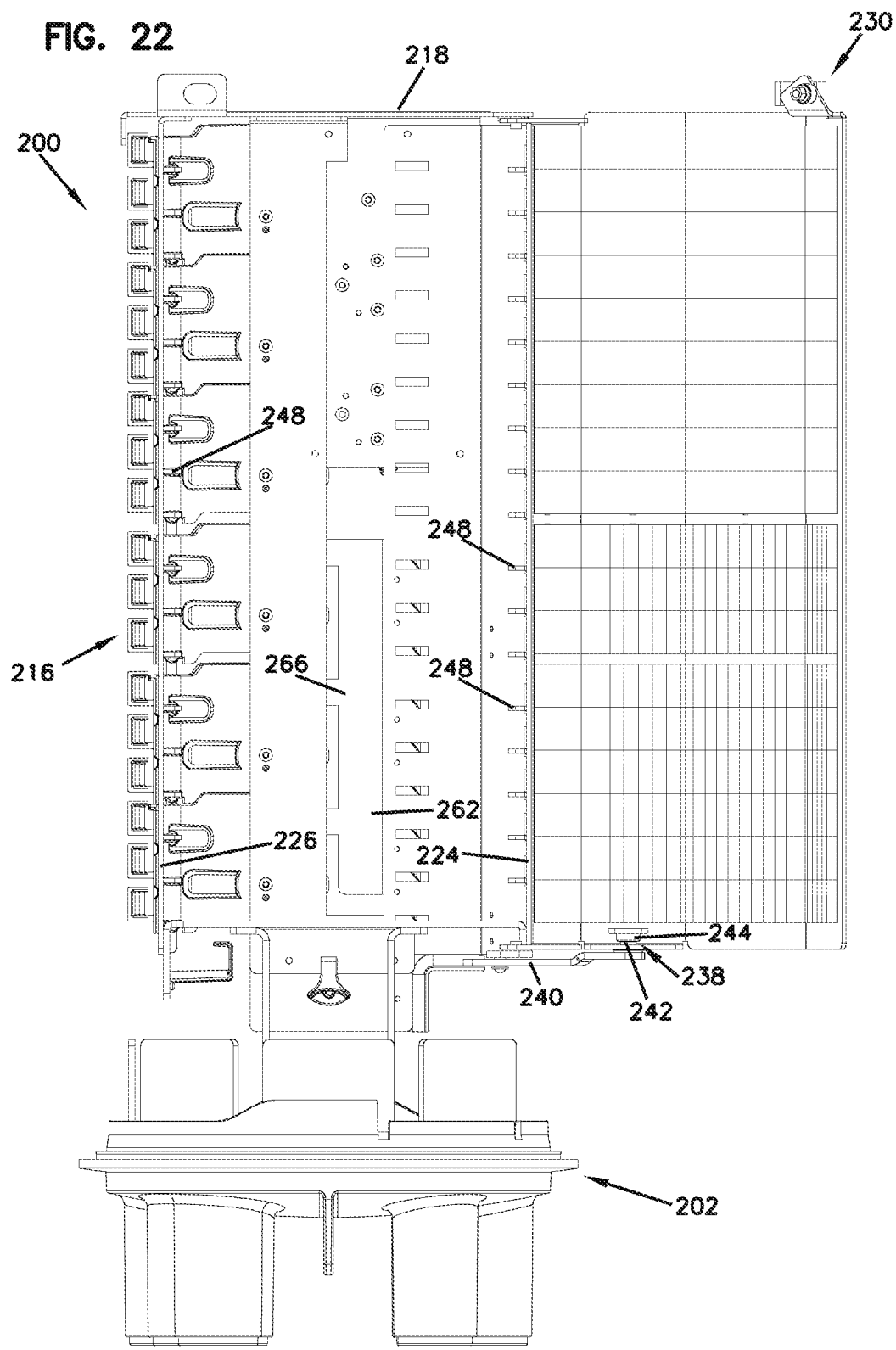
FIG. 22 illustrates the chassis/frame of FIG. 19 in an empty configuration.
Figure 23:
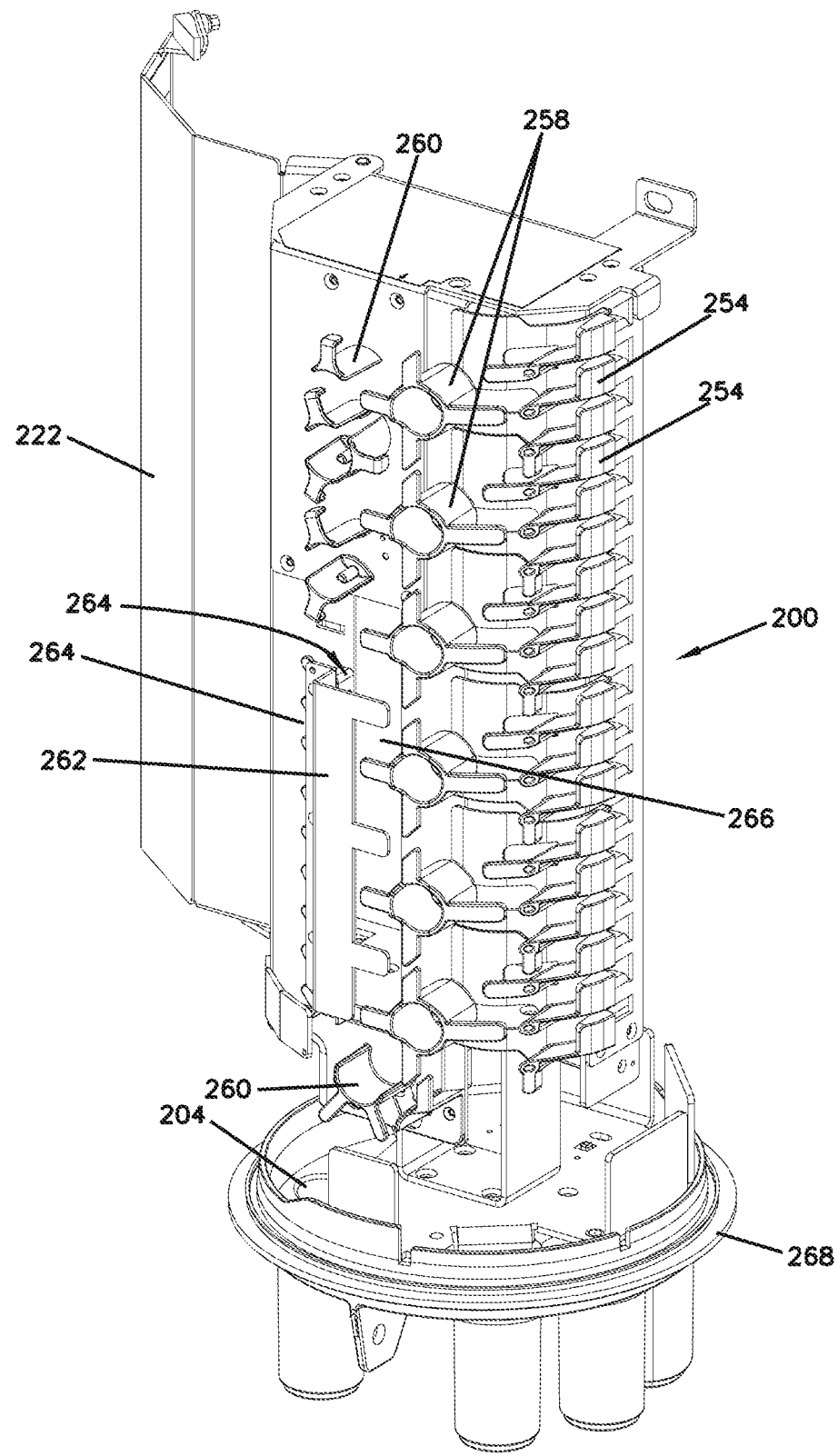
FIG. 23 illustrates the chassis/frame of FIG. 20 in an empty configuration.

In FIGS. 18-20, the module mounting portion 216 of the frame 200 is shown populated with a plurality of assemblies 10. In FIGS. 21-23, the frame 200 is shown in an empty configuration for illustrating the interior details of the housing 218.

The housing 218 defines an open front 220 that is closed by a hinged door 222. The housing 218 further defines right and left sidewalls 224, 226 and a rear wall 228, configured to cooperatively receive the inserted assemblies 10 through the open front 220.

In the embodiment shown in FIGS. 18-27, a swell latch 230 is used to keep the door 222 closed with respect to the housing 218. Other types of latches can also be used.

Referring now to FIGS. 18 and 20, the door 222 and the housing 218 define intermating structures for temporarily keeping the door 222 in an open position so that a technician can freely access the connection locations provided on the assemblies 10 within the housing 218. In the embodiment shown, the door 222 defines a slide guide opening 232 at the bottom thereof that has a narrower slide portion 234 and a wider retention portion 236. The guide opening 232 cooperates with a guide pin 238 that is spring-loaded to be biased downwardly. The guide pin 238 extends from the housing 218 via a pivotally disposed arm 240. The guide pin 238 defines a narrow portion 242 that is sized to slide within the narrow portion 234 of the guide opening 232. The guide pin 238 also defines a wider portion 244 that is sized to fit within the wider retention portion 236 of the guide opening 232 but not in the narrower slide portion 234. When the door 222 is in a predetermined position (may be the fully or partially opened position), the guide pin 238 is biased downwardly such that the wider portion 244 of the guide pin 238 is aligned with and able to move into the wider portion 236 of the guide opening 232. Since the wider portion 236 of the guide pin 238 is not sized to slidably fit through the narrow portion 234 of the opening 232, the guide pin 238 locks the door 222 in the predetermined, e.g., open, position. The guide pin 238 has to be lifted upward against a bias force in order to align the narrow portion 242 of the guide pin 238 with the narrow portion 234 of the guide opening 232 for slidably pivoting the door 222 to a closed position.

Referring back to FIGS. 18-20, once each of the assemblies 10 is formed, the assemblies 10 are slidably loaded into the housing portion 218 of the frame 200 in a vertically stacked arrangement as shown in FIGS. 18-20. Cantilever arms 246 provided on each tray 14 are used for fixing the trays 14 to the frame 200 with a snap-fit interlock.

The frame 200 is shown in an empty configuration in FIGS. 21-23 to illustrate the assembly mounting locations in greater detail. As shown, bent portions 248 on right and left walls 224, 226 of the housing 218 define slide surfaces 250 that slidably guide each tray 14 into the frame 200. The cantilever arms 246 cooperate with apertures 252 formed on the right and left walls 224, 226 of the housing 218 to flexibly lock the assemblies 10 into place.

Now referring back to FIGS. 18-20, provided around the exterior of the housing 218 are a number of cable management structures that are configured to guide individual cables 208 broken out from the bundle cables 206 entering the enclosure 214. The cable management structures may be used to guide cables 208 to and/or from the assemblies 10 mounted within the housing 218.

As shown from a rear perspective view of the chassis 200 in FIGS. 20 and 23, the module mounting portion 216 defines a plurality of curved radius limiters 254 in a vertically stacked arrangement at the rear left corner, each one configured to receive cables 208 coming from radius limiters 256 positioned on the trays 14 of the assemblies 10.

Still referring to FIGS. 20 and 23, positioned toward the rear center of the chassis 200 are a plurality of spools 258 provided in a vertically stacked arrangement. The spools 258 are configured to guide cables 208 coming from and going to the curved radius limiters 254 of the frame 200 and take up slack for any cabling 208 extending between the different layers of modules 12. Another set of cable spools 260 are positioned to the right of the spools 258 and may be used for either further cable slack management or to separate cables coming from a given module 12 and provide separate cable paths to different modules 12 positioned toward the front of the chassis 200.

A cable management plate 262 is positioned underneath a majority of the cable spools 260. The plate 262 defines a plurality of radiused passages 264 at the right side thereof for guiding broken out cables 208 from the bundled cable 206 into the rears of the modules 12. As shown, the broken out cables 208 can enter the rear inputs of the modules 12 through an opening 266 provided at the rear wall 228 of the housing 218. The plate 262 is configured to partially cover the opening 266 to protect the input cables 208. When a bundled cable 206 sealably enters the enclosure 214, cables 208 that are broken out may be looped (e.g., at least once) within the cable seal portion 202 of the frame 200 and lead upwardly to the rear sides of the modules 12 within the module mounting portion 216 of the frame 200. When the cables 208 are lead upwardly, they pass through the radiused passages 264 defined by the plate 262, enter into the housing 218 through the opening 266, and are terminated or crimped to rear sides of the modules 12.

Furthermore, the plate 262 can guide cables coming from the cable spools, either the right set 260 or the left set 258, downwardly such that the cables can be routed back up around the spools 258 to the modules 12.

When the cables are routed back toward the modules 12, they pass through the curved radius limiters 254 located at the rear left corner of the frame 200 and through the radius limiters 256 of the associated trays 14 before being lead to a given module 12.

It should be noted that the frame 200 is configured to allow for a variety of fiber connectivity implementations depending upon the types of modules 12 that are used on the frame 200. As noted earlier, a bundled cable 206 can carry input and output signals (via broken out individual cables 208) through the same bundled cable 206. The cable management features at the rear of the frame 200 are used according to the routing involved between different layers of modules 12.

For example, according to one implementation (similar to the connectivity arrangement illustrated in FIGS. 28-30) the bundled cable 206 can feed a number of feeder or input signals into a number of the modules 12 mounted on the frame 200. An output from a given module 12 can enter the input of another module 12 (e.g., a splitter module) at a different layer and be split into a plurality of signals that can be relayed to different module layers on the frame 200. As discussed previously, the cable spools 258, 260 at the rear of the housing 218 can be used in managing the cables routed between the different layers. An example of a module that houses a fiber optic splitter for this type of a connectivity arrangement may be similar to the module 12 described above.

Figure 28:
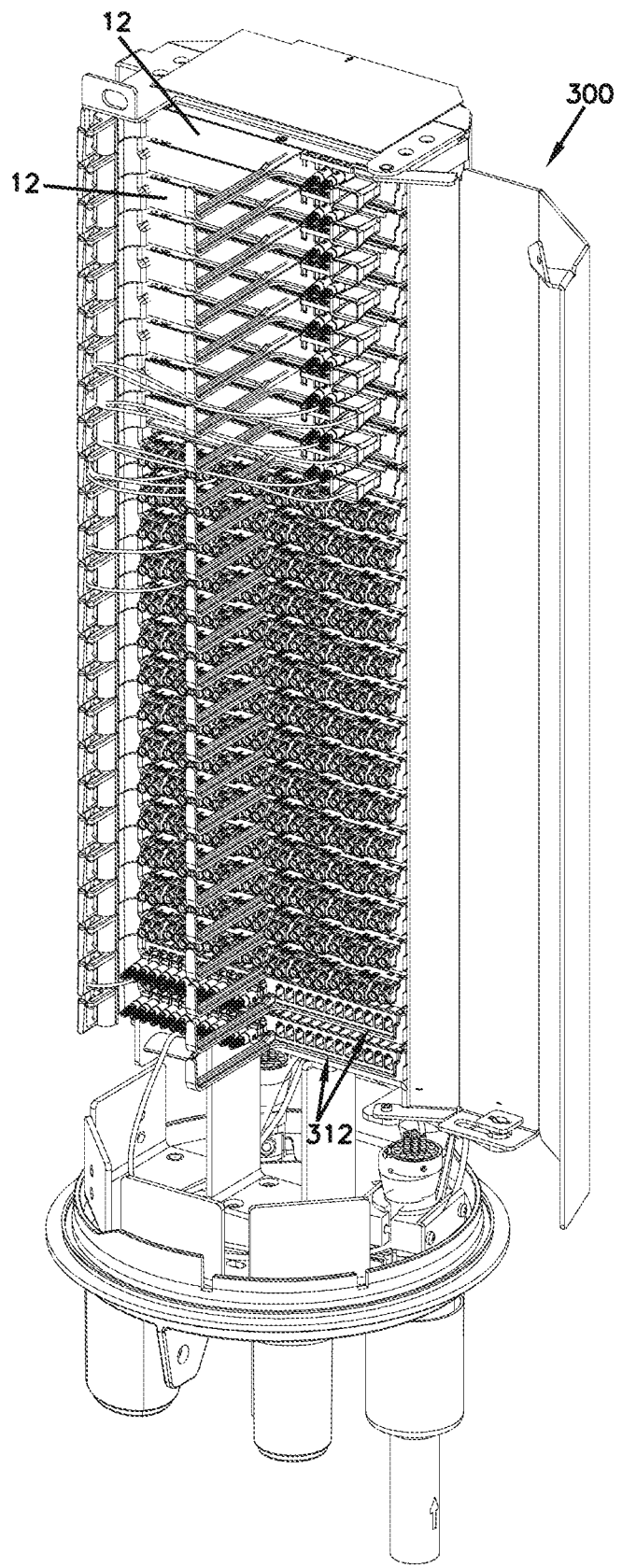
FIG. 28 is a front perspective view of another embodiment of a telecommunications chassis/frame configured to receive a plurality of the telecommunications assemblies of FIGS. 1-13, the chassis shown populated with a plurality of telecommunications assemblies and shown in an open access position.
Figure 29:
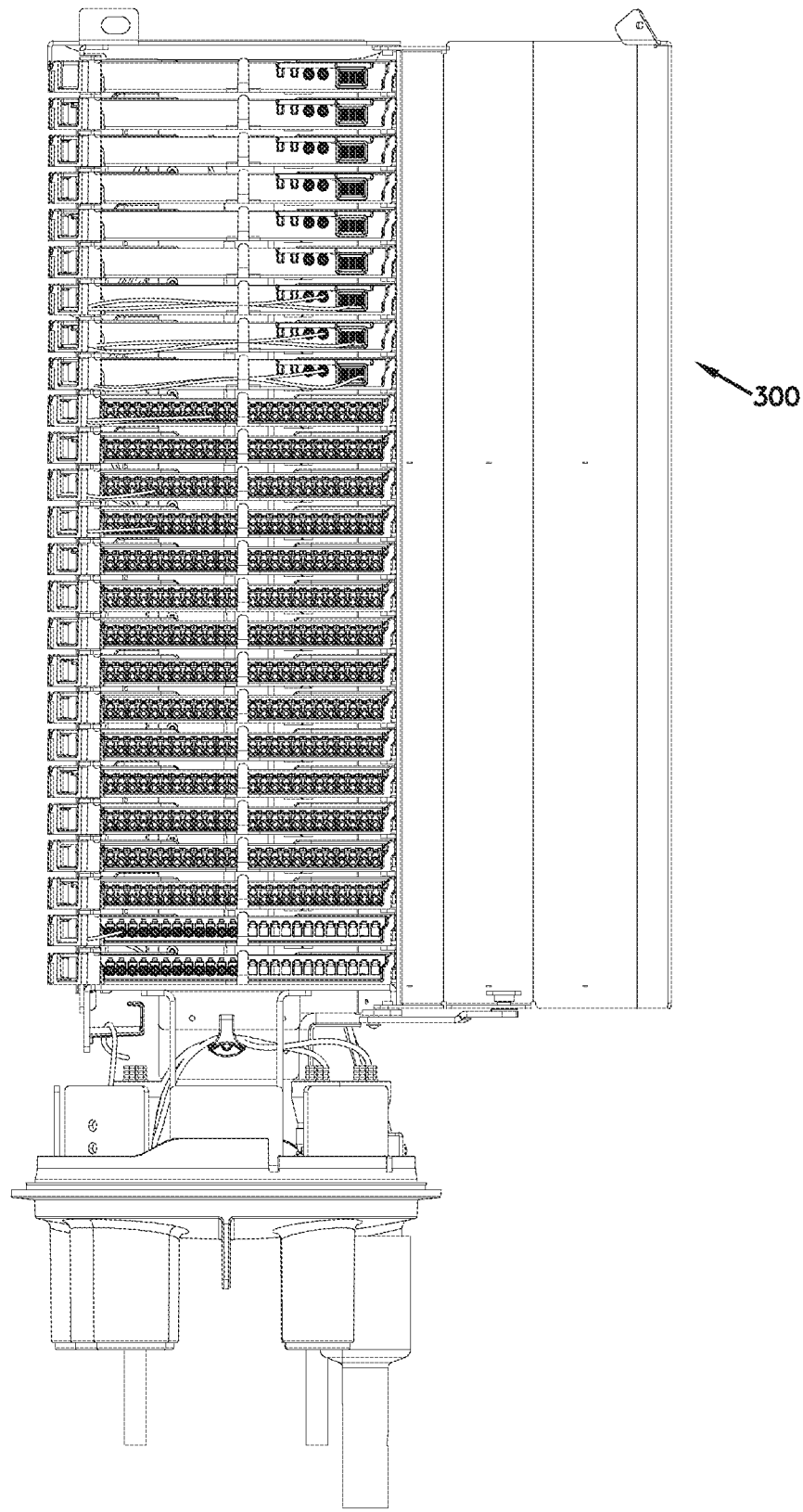
FIG. 29 is a front view of the telecommunications chassis/frame of FIG. 28.
Figure 30:
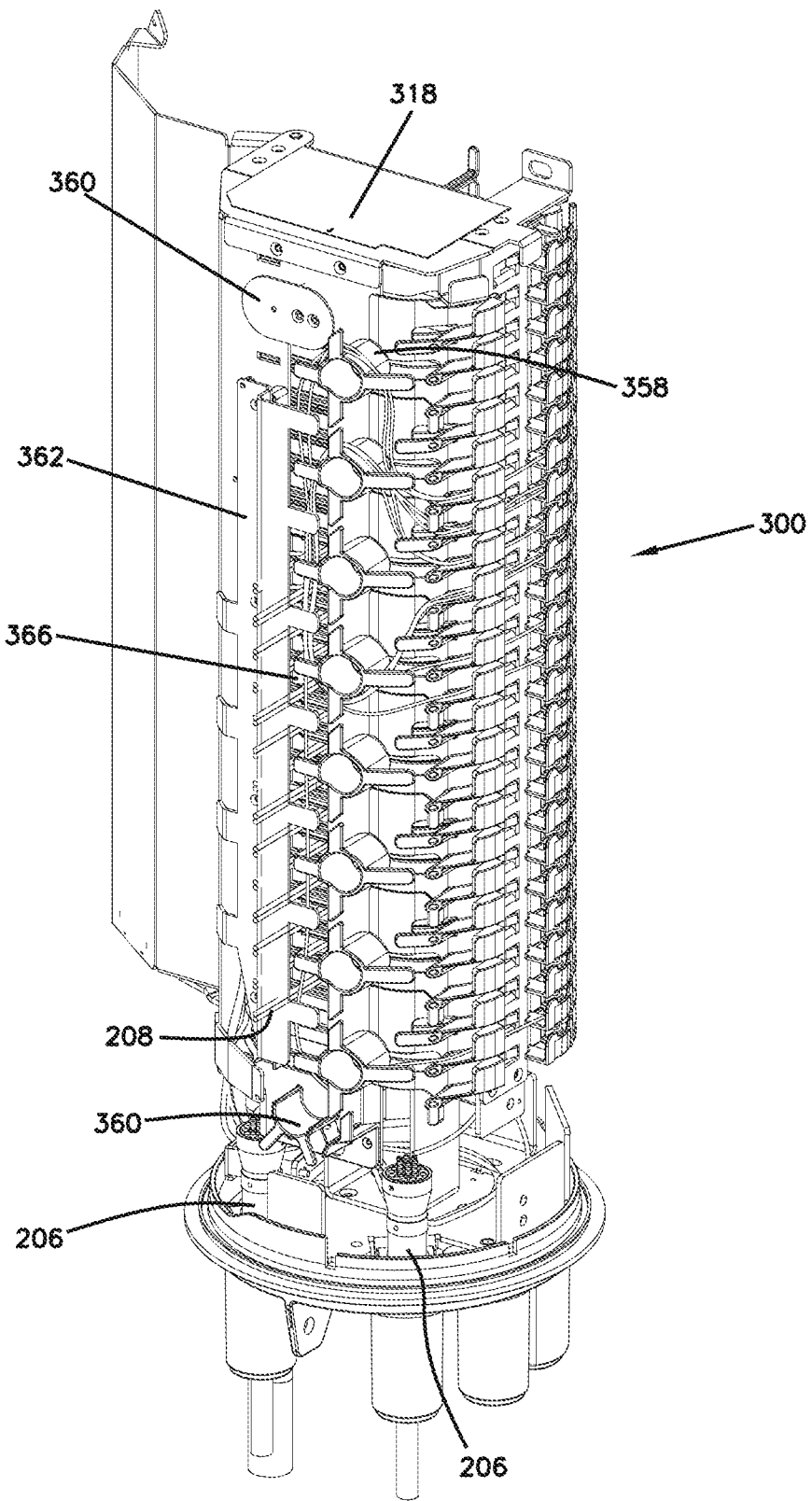
FIG. 30 is a rear perspective view of the telecommunications chassis/frame of FIG. 28.
Figure 31:
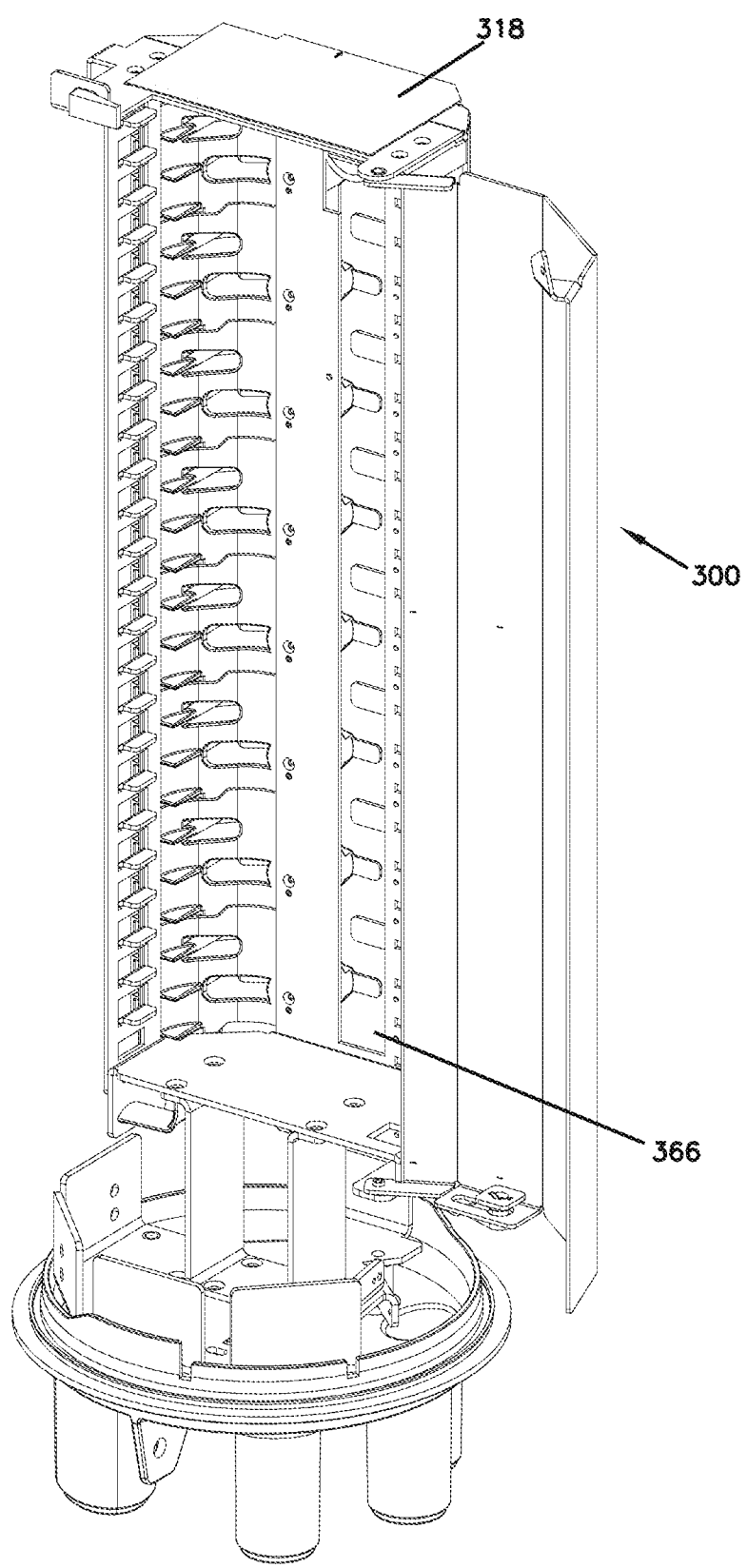
FIG. 31 illustrates the chassis/frame of FIG. 28 in an empty configuration.
Figure 32:
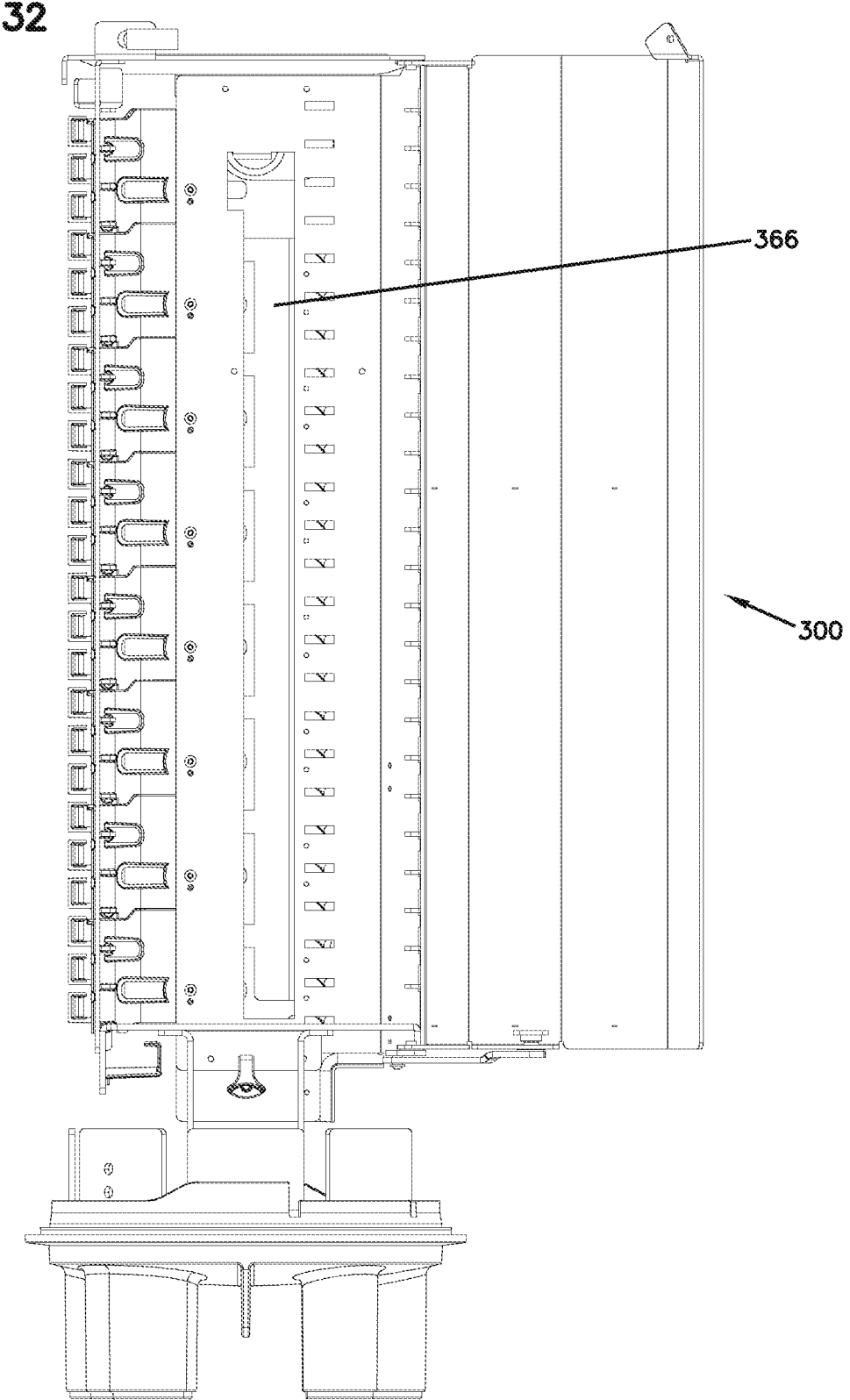
FIG. 32 illustrates the chassis/frame of FIG. 29 in an empty configuration.

In the illustrated example of FIGS. 28-30, a "parking lot" feature is also provided on the chassis 300. As shown, a number of the modules may be implemented as "parking lot" or connector storage modules 312 (the bottom two layers in the given example) that can be used to hold live-signal connectors until they are connected to a given module 12 for further processing.

Figure 24:
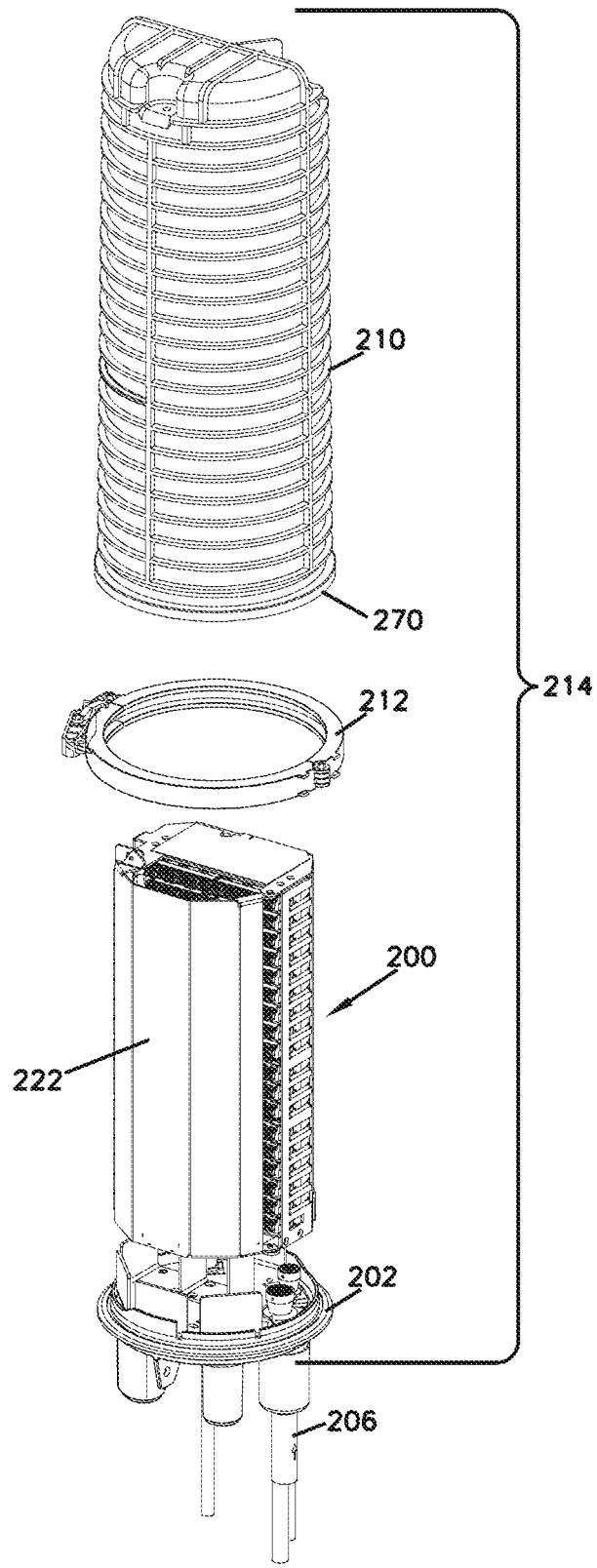
FIG. 24 illustrates a partially exploded view of a sealed enclosure formed by clamping a cover/dome on the chassis/frame of FIGS. 18-23.
Figure 25:
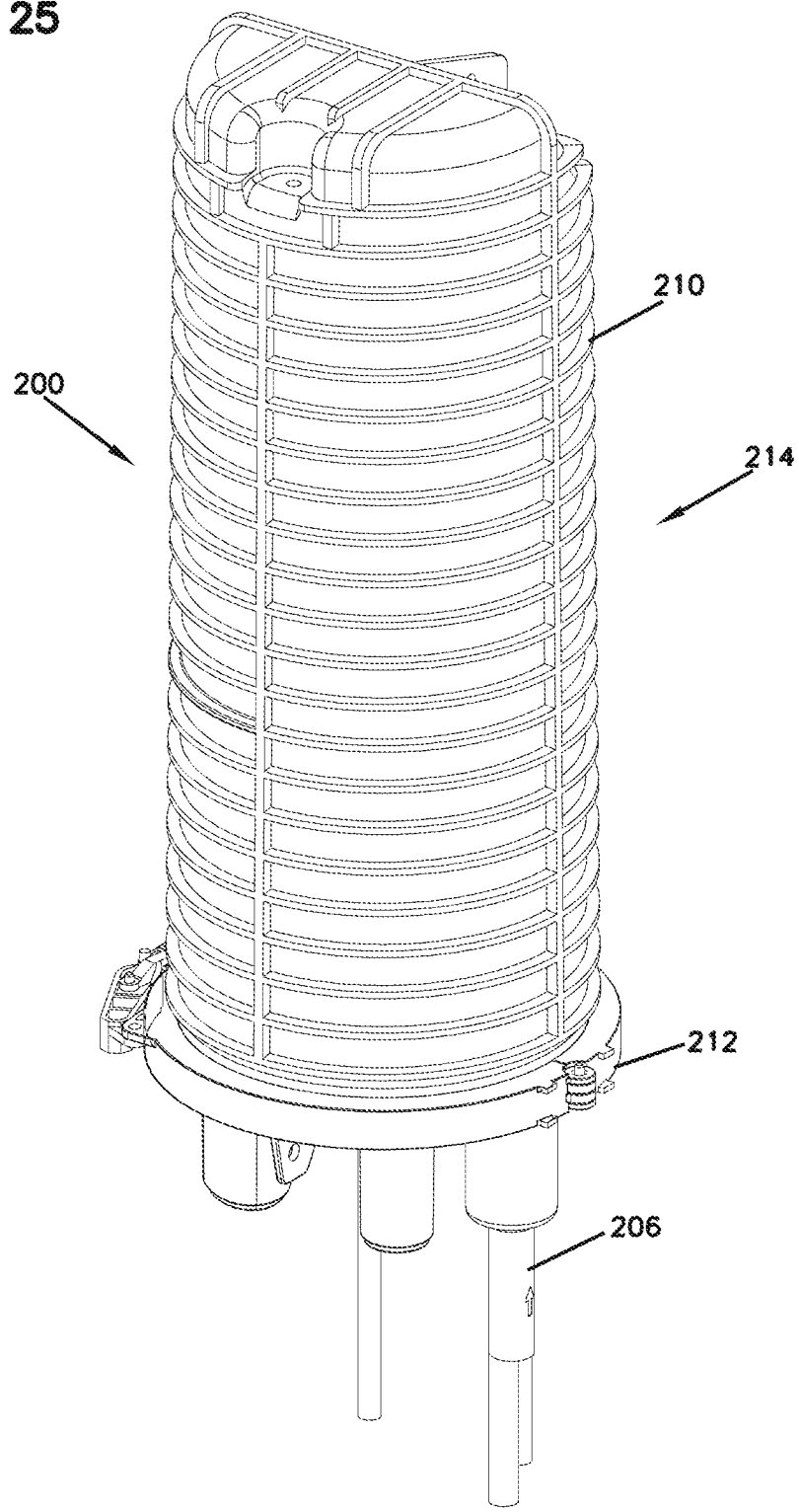
FIG. 25 illustrates the enclosure of FIG. 24 in an assembled configuration.

As noted above, the cable seal portion 202 of the frame 200 can receive a cover 210 to seal the module mounting portion 216 from the environment. As shown in FIGS. 24-25, abutting flanges 268, 270 of the cable seal portion 202 and the cover 210 can be clamped via a clamp 212. Further sealants such as an O-ring may also be used.

For a taller frame such as the frame 300 of FIGS. 28-37, a pair of spacer collars 272 and multiple clamps 212 may be used to enclose the frame 300. It should be noted that by using the spacer collars 272, the same cover 210 can be utilized for both sizes of the frames.

As noted above, the frames 200, 300 of the present disclosure may be provided as underground telecommunications fixtures or may be provided as above ground pole-mounted fixtures (as illustrated in FIGS. 26-27 and 36-37).

Figure 26:
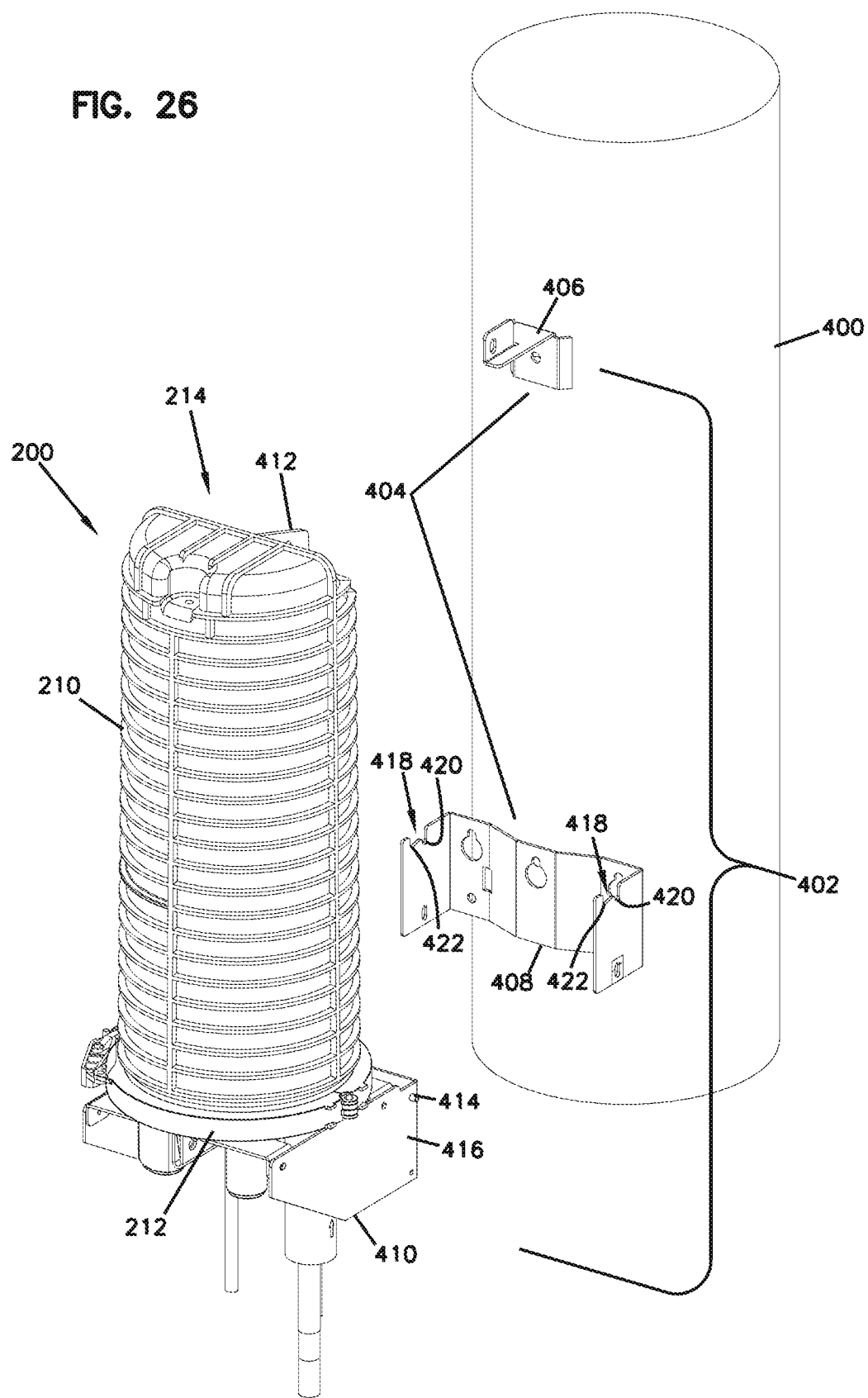
FIG. 26 illustrates a partially exploded view of the enclosure of FIGS. 24-25 being mounted on a vertical surface such as a telecommunications pole.
Figure 27:
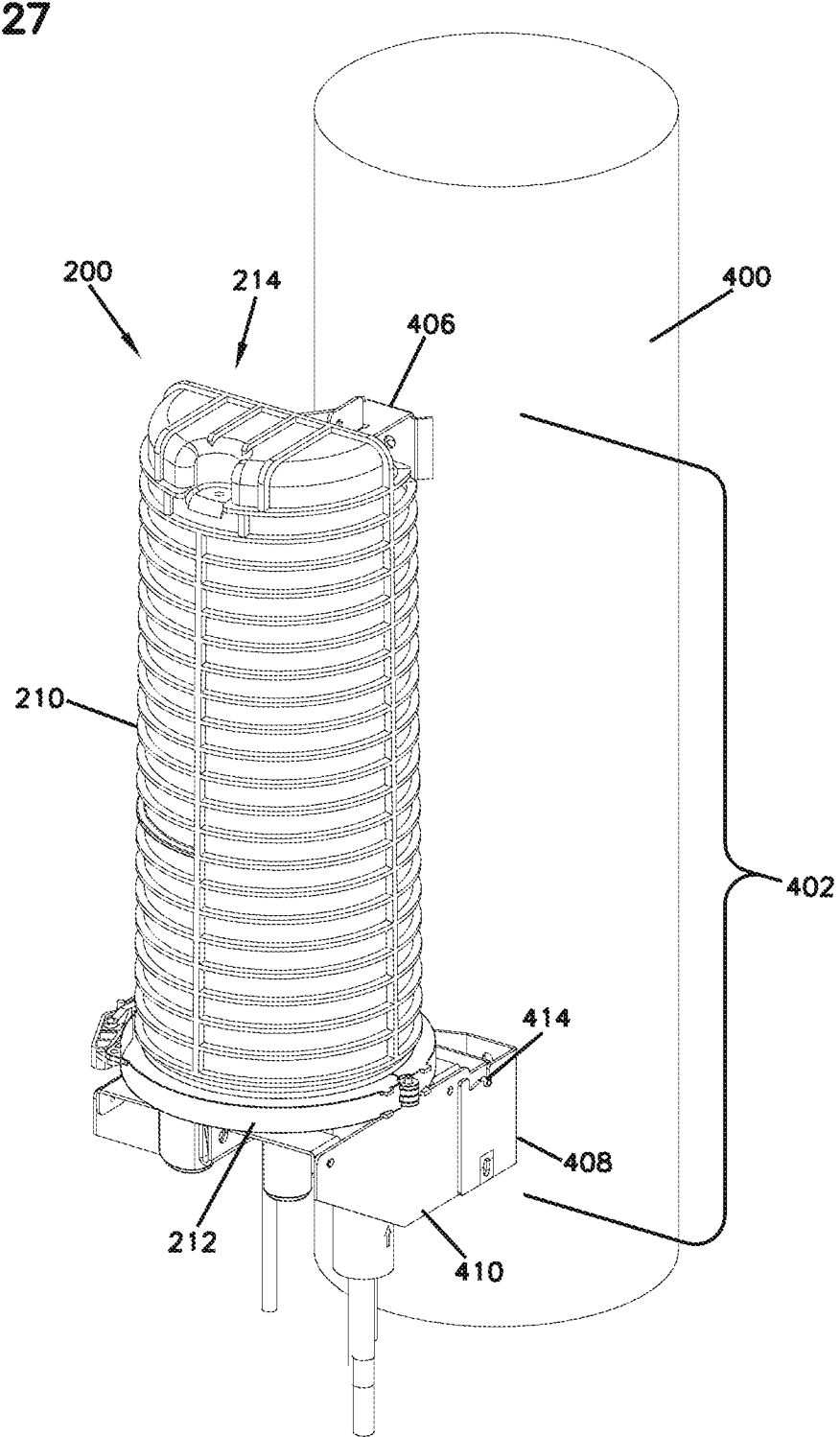
FIG. 27 illustrates the enclosure of FIG. 26 in a fully mounted position.

As shown, for example, in FIGS. 26-27, the frame may be mounted to a telecommunications pole 400 via a bracket assembly 402. The bracket assembly 402 may include a pole mount portion 404 defined by an upper part 406 and a lower part 408 that is mounted on the pole 400 and a frame mount portion 410 that is mounted to the cable seal portion 202 of the frame 200.

Adjacent the top end thereof, the cover 210 also defines a mount 412 that is configured to cooperate with the upper part 406 of the pole mount portion 404 of the bracket assembly 402 to secure the frame 200 to the pole 400.

As shown, the frame mount portion 410 of the bracket assembly 402 that is attached to the cable seal portion 202 of the frame 200 defines a pair of pins 414 projecting from sidewalls 416 thereof. The pins 414 cooperate with notches 418 defined on the lower part 408 of the pole mount portion 404 of the bracket assembly 402. The notch 418 defined on each side includes a locking portion 420 and an access portion 422. When the pin 414 is in the locking portion 420 of the notch 418, the enclosure 214 sits vertically upright and the cover 210 can be fastened to the upper part 406 of the pole mount portion 404 of the bracket assembly 402. When one of the clamps 212 needs to be taken off to remove the cover 210 to access the interior of the enclosure 214, first, a fastener used to couple the dome 210 to the upper part 406 of the pole mount portion 404 of bracket assembly 402 is removed. Next, each pin 414 is moved into the access portion 422 of the notch 418 of the lower part 408 of the pole mount portion 404 of the bracket assembly 402. Lifting the pin 414 out of the locking portion 420 of the notch 418 and sliding the pin 414 into the access portion 422 of the notch 418 brings the enclosure 214 to a pivoted/tilted position. At this point, the clamp 212 around the cover 210 can be loosened and the cover 210 can be removed for accessing the interior of the enclosure 214. When the technician is finished with the enclosure 214, the cover 210 may be clamped and the enclosure 214 can be tilted back to the upright position by sliding the pin 218 into the locking portion 420 of the notch 418. And, at this point, the enclosure 214 can be fastened to the pole 400 at the upper part 408 of the pole mount portion 404 of the bracket assembly 402.

As noted previously, unless otherwise stated, the above description is fully applicable to the taller-profiled frame 300 of FIGS. 28-37.

Figure 34:
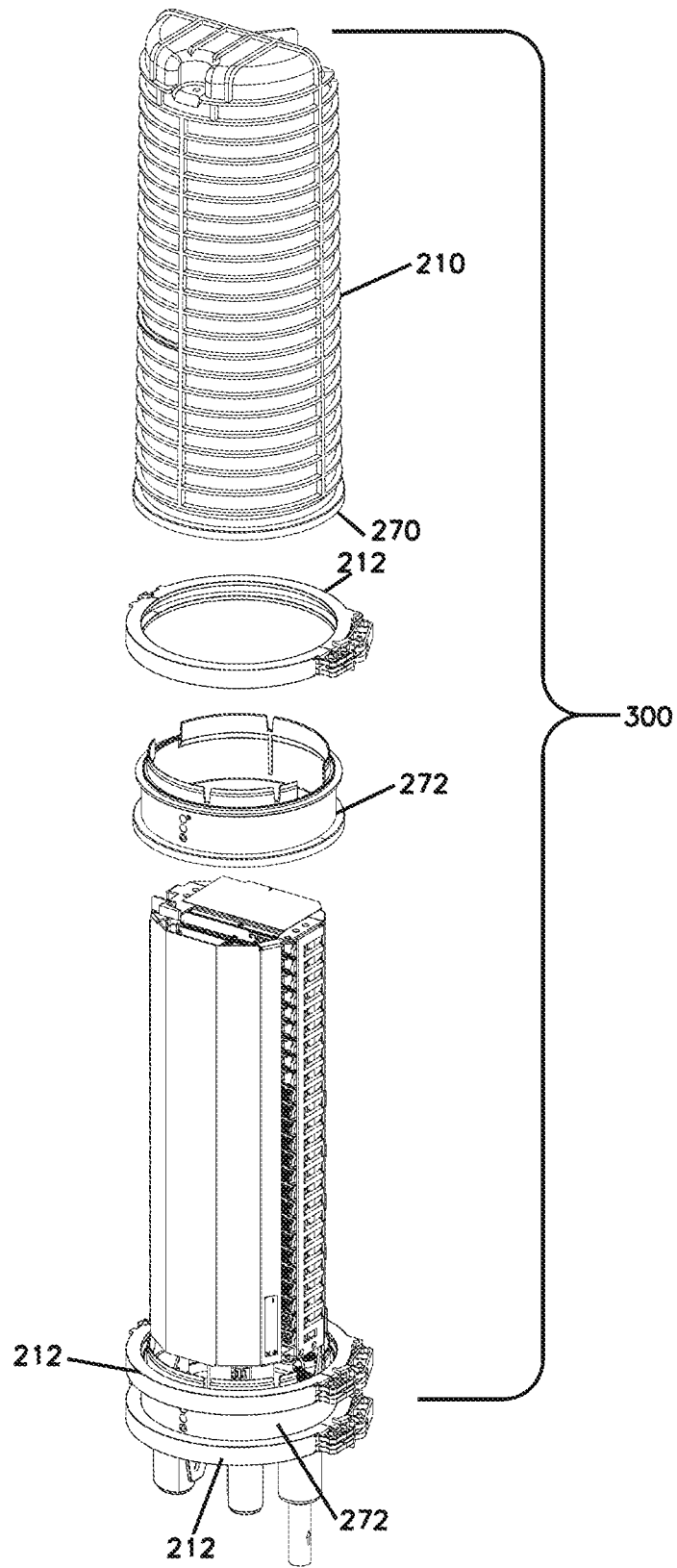
FIG. 34 illustrates a partially exploded view of a sealed enclosure formed by clamping a cover/dome on the chassis/frame of FIGS. 28-33.
Figure 35:
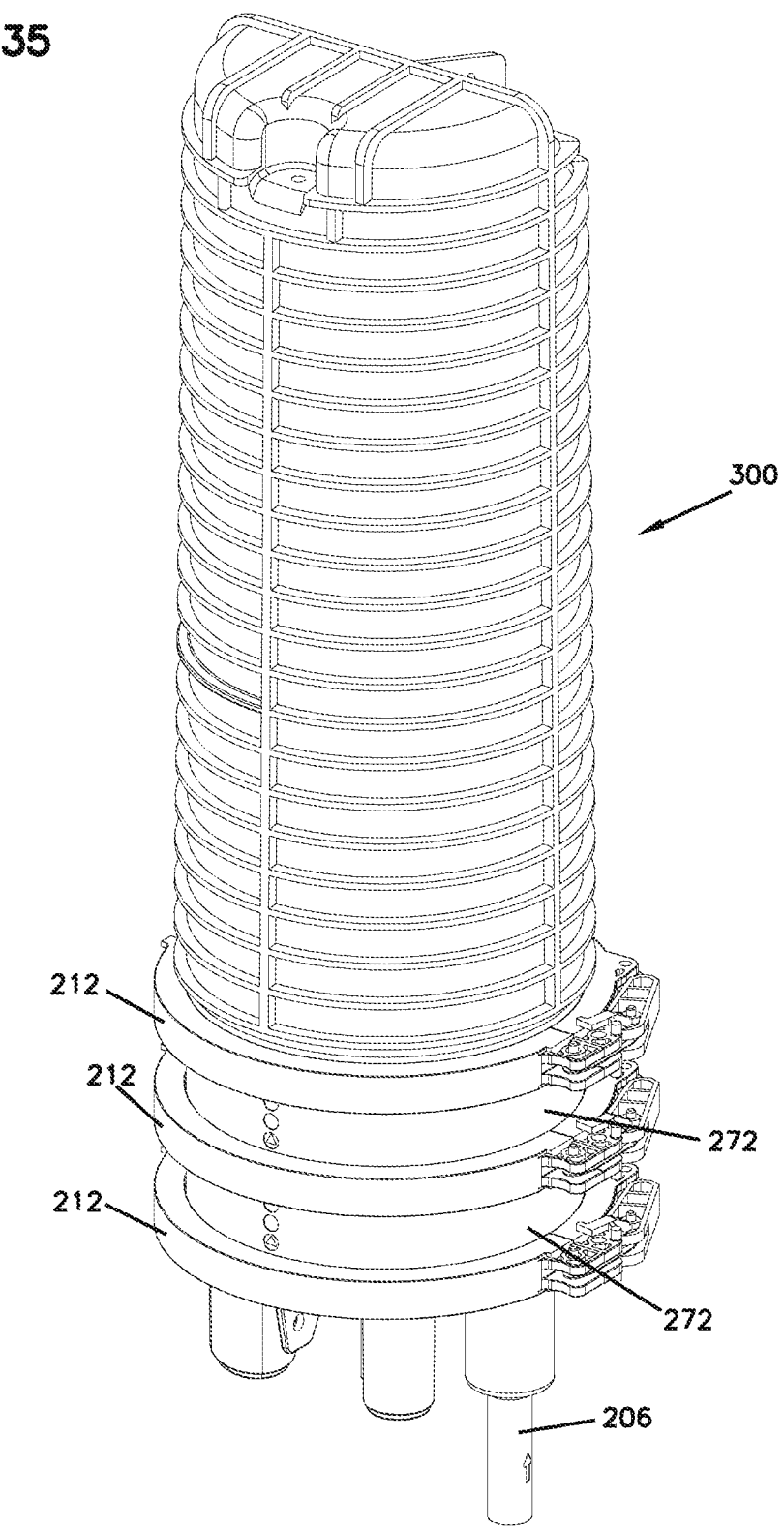
FIG. 35 illustrates the enclosure of FIG. 34 in an assembled configuration.
Figure 36:
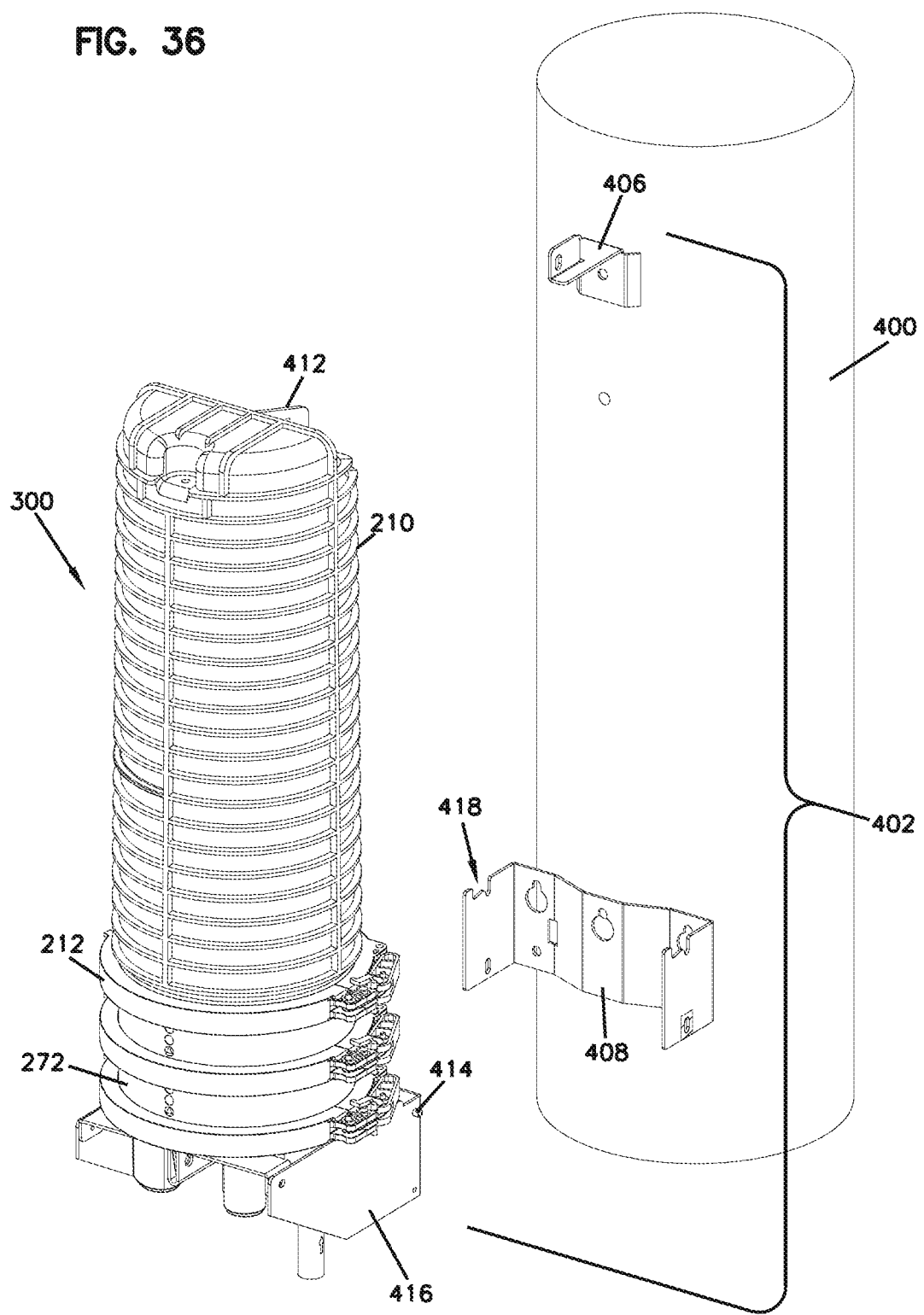
FIG. 36 illustrates a partially exploded view of the enclosure of FIGS. 34-35 being mounted on a vertical surface such as a telecommunications pole.
Figure 37:
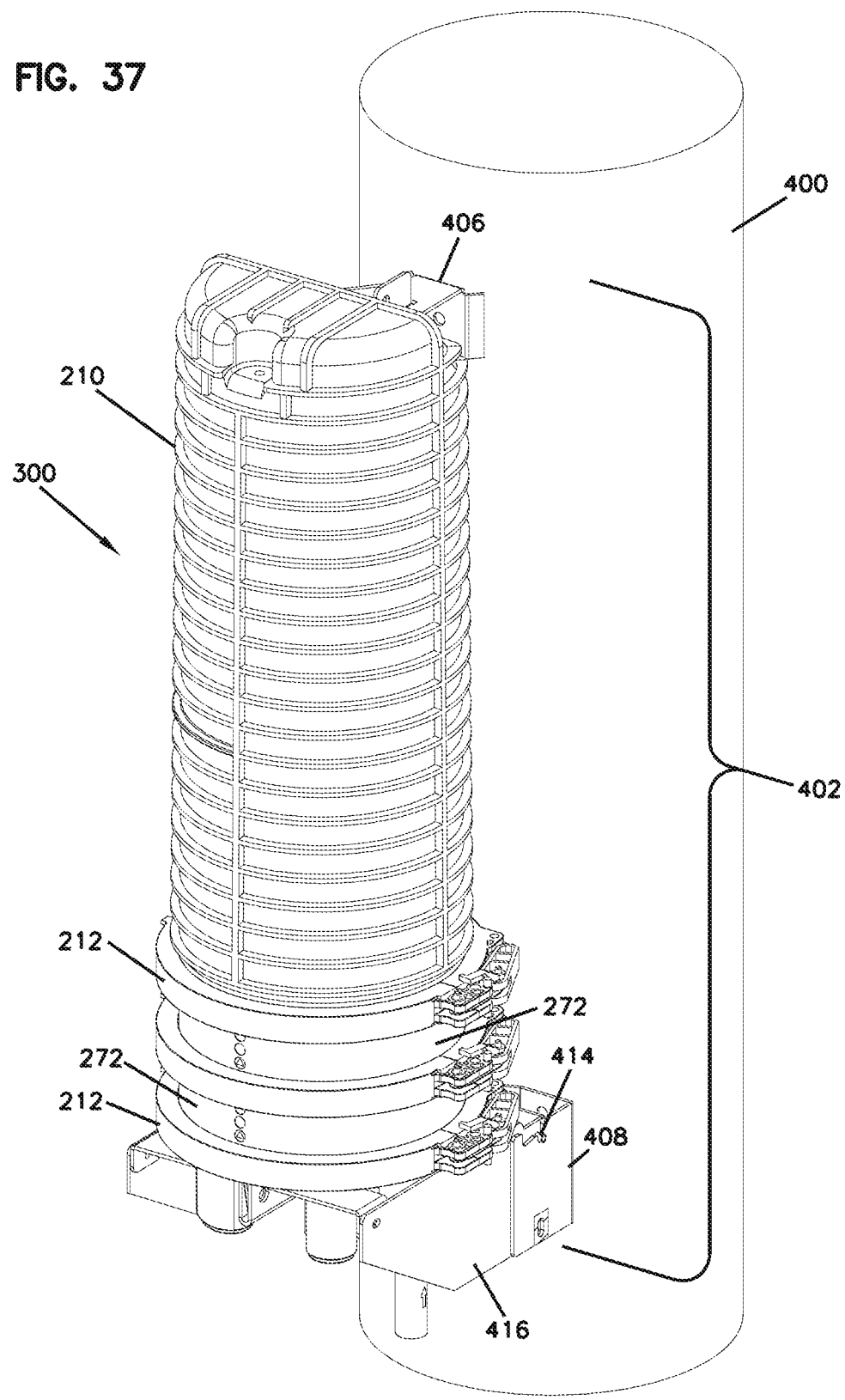
FIG. 37 illustrates the enclosure of FIG. 36 in a fully mounted position.

Referring specifically to FIGS. 34-35, it should be noted that in order to access all of the connection locations within the frame 300, the middle clamp 212, rather than the uppermost clamp 212, has to be removed when removing the dome 210. As such, when the dome 210 is removed, the upper collar 272 stays clamped to the dome 210 with the uppermost clamp 212. Otherwise, the upper collar 272, if left mounted to the lower collar 272, may block or limit access to some of the connection locations of the frame 300.

Figure 33:
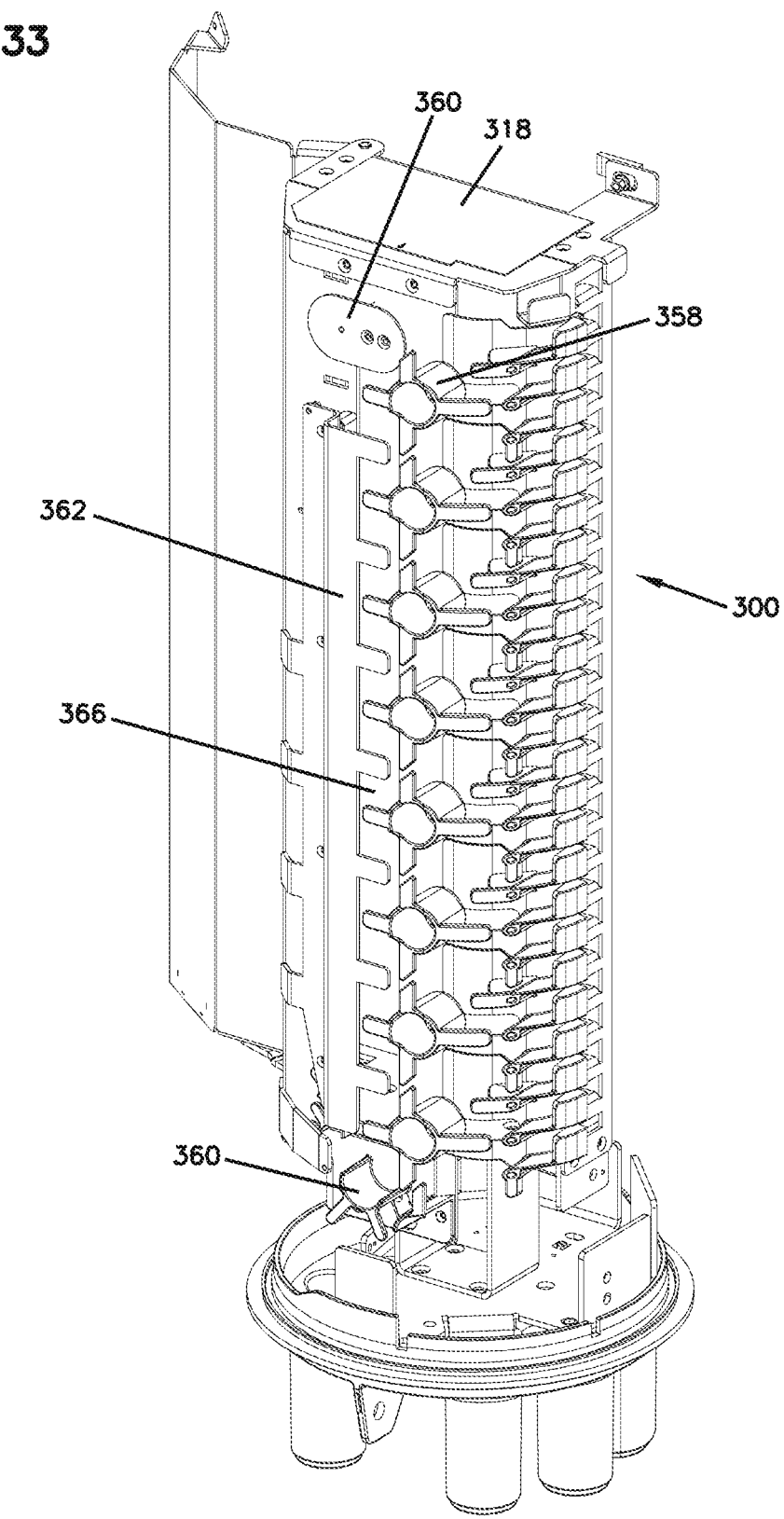
FIG. 33 illustrates the chassis/frame of FIG. 30 in an empty configuration.

Referring to FIGS. 30 and 33, it should also be noted that the taller-profiled frame 300 includes a longer cable management plate 362 at the rear exterior of the housing 318 for covering a longer opening 366 and defines a single cable management spool 360 above the plate 362 and a single cable management spool 360 below the plate in addition to the spools 358 provided to the left of the plate, all serving similar functionality as those discussed above with respect to frame 200.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. A telecommunications chassis comprising:
a cable sealing portion defining at least one cable opening configured to sealably receive a cable; and
a module mounting portion extending from the cable sealing portion, the module mounting portion further comprising:
a housing defining an open front closable by a door to define an interior, a rear wall, a right wall, and a left wall, the housing further defining a plurality of module mounting locations provided in a vertically stacked arrangement within the interior, each configured to receive a telecommunications module through the open front, an exterior of the housing including a first column of radius limiters each defining a curved profile for guiding cables from the front of the housing toward the rear with bend control, the exterior of the housing including a second column of radius limiters in the form of spools that are spaced apart and generally parallel to the first column of radius limiters, the exterior of the housing further including a third column of radius limiters, at least some of which are in the form of spools that are spaced apart and generally parallel to the first and second columns of radius limiters, the rear wall defining an opening for accessing, from the exterior of the housing, rear ends of modules to be mounted in the housing for signal input, wherein the exterior of the housing includes a plate at least partially overlapping the opening for protection of cables entering the opening.

2. The telecommunications chassis of claim 1, further comprising a dome sealably attached to the cable sealing portion of the chassis for forming an enclosure.

3. The telecommunications chassis of claim 2, wherein the dome is removably attached to the chassis via a clamp.

4. The telecommunications chassis of claim 1, wherein, when the door is closed, the housing defines a generally cylindrical configuration.

5. The telecommunications chassis of claim 1, wherein the cable sealing portion defines a channel for looping of cabling entering the chassis through the at least one cable opening.

6. The telecommunications chassis of claim 1, further comprising a plurality of telecommunications modules mounted to the housing.

7. The telecommunications chassis of claim 6, wherein each of the telecommunications modules is mounted via flexible cantilever arms forming a snap-fit interlock.

8. The telecommunications chassis of claim 7, wherein at least one of the telecommunications modules is a connector-storage module configured to temporarily hold a plurality of live-signal connectors without relaying signals of the connectors.

9. The telecommunications chassis of claim 6, wherein at least one of the telecommunications modules carries a fiber optic component in the form of a fiber optic splitter for splitting input signals into a plurality of the same output signals.

10. The telecommunications chassis of claim 1, further comprising a spring-biased latch for keeping the door at a predetermined open position.

11. The telecommunications chassis of claim 1, further comprising a locking latch for keeping the door at a closed position.

12. The telecommunications chassis of claim 10, wherein the locking latch includes a swell latch.

13. The telecommunications chassis of claim 2, further comprising a removable extension collar provided between the dome and the cable sealing portion of the chassis.

14. The telecommunications chassis of claim 13, wherein the extension collar is clamped via removable clamps to both the cable sealing portion of the chassis and the dome.

* * * * *